United States Patent
Iwasaki et al.

[11] Patent Number: 5,740,149
[45] Date of Patent: Apr. 14, 1998

[54] PHASE-CHANGE TYPE OPTICAL RECORDING AND REPRODUCING METHOD

[75] Inventors: Hiroko Iwasaki, Tokyo; Yukio Ide, Mishima; Yoshiyuki Kageyama, Yokohama; Makoto Harigaya, Hiratsuka; Michiharu Abe, Yokohama, all of Japan

[73] Assignee: Ricoh Company, Limited, Tokyo, Japan

[21] Appl. No.: 791,786

[22] Filed: Jan. 29, 1997

Related U.S. Application Data

[62] Division of Ser. No. 631,327, Apr. 12, 1996.

[30] Foreign Application Priority Data

| Apr. 14, 1995 | [JP] | Japan | 7-089464 |
| Aug. 7, 1995 | [JP] | Japan | 7-201021 |
| Sep. 11, 1995 | [JP] | Japan | 7-232547 |
| Apr. 8, 1996 | [JP] | Japan | 8-085307 |

[51] Int. Cl.$^6$ .................................................. G11B 7/00
[52] U.S. Cl. ............................................. 369/116; 369/54
[58] Field of Search ........................... 369/116, 54, 14, 369/126, 13, 275.2, 58

[56] References Cited

U.S. PATENT DOCUMENTS

| 5,150,351 | 9/1992 | Ohne et al. | 369/116 |
| 5,471,457 | 11/1995 | Bakx et al. | 369/116 |
| 5,475,666 | 12/1995 | Ito et al. | 369/54 |

(List continued on next page.)

FOREIGN PATENT DOCUMENTS

| 0 405 610 A2 | 1/1991 | European Pat. Off. . |
| 0 475 558 A | 3/1991 | European Pat. Off. . |
| 0 587 111 A1 | 3/1994 | European Pat. Off. . |

(List continued on next page.)

OTHER PUBLICATIONS

Kenichi Nishiuchi et al., Feasibility Study of Ge–Sb–Te Phase–Change Optical Disk Medium for One–Pass Overwrite Digital Audio Recording, Feb. 31, 1992, pp. 653–658.

Hiroko Iwasaki et al. "Completely Erasable Phase Change Optical Disc II Application of Ag–In–Sb–Te Mixed Phase System For Rewritable Compact Disc Compatible with CD–Velocity and Double CD–Velocity." Jpn J. Appl. Phys. vol. 32 Nov. 1993, pp.5241–5247 part 1 No. 11B.

(List continued on next page.)

*Primary Examiner*—Tan Dinh
*Attorney, Agent, or Firm*—Lowe, Price, LeBlanc & Becker

[57] ABSTRACT

When recording data according to the PWM recording system by modulating signals, pulse modulation for pulse modulation for recording for recording a 0 signal or the like having a signal width of nT (T: Clock time) after modulation is a continuous electro-magnetic wave at a power level e, a record signal pulse array for recording a 1 signal or the like having a signal width of nT after modulation comprises a pulse section fp having a time width x and a power level a, a multi-pulse section mp in which a low level pulse at a power level b and a high power pulse at a power level c having a time width T in total alternately appear (n-n') times in all with a duty ratio y, and a pulse section op having a time width z and a power level d, and x, y, z are integers satisfying the conditions of $0.5T \leq x \leq 2T$, $0.4 \leq y \leq 0.6$ and $0.5T \leq z \leq 1T$, and n' is a positive integer which is equal to or smaller than n, and controls are provided so that the condition of (a and c)>e>(b and d) is satisfied.

2 Claims, 9 Drawing Sheets

U.S. PATENT DOCUMENTS

| | | | |
|---|---|---|---|
| 5,513,165 | 4/1996 | Ide et al. | 369/116 |
| 5,608,710 | 3/1997 | Minemura et al. | 369/116 |
| 5,629,913 | 5/1997 | Kaku et al. | 369/54 |
| 5,642,343 | 6/1997 | Toda et al. | 369/54 |

FOREIGN PATENT DOCUMENTS

| | | |
|---|---|---|
| 42 17 279 A1 | 4/1993 | Germany . |
| 63-29336 | 6/1988 | Japan . |
| 63-266632 | 11/1988 | Japan . |
| 63-266633 | 11/1988 | Japan . |
| 5-151619 | 6/1993 | Japan . |
| 7-78031 | 3/1995 | Japan . |
| WO 93 26001 A | 12/1993 | WIPO . |

OTHER PUBLICATIONS

Tokuhiko Handa et al. "In–Ag–Te–Sb Phase Change Recording Media at Compact Disk Linear Velocity." Jpn J. Appl. Phys. vol. 32 (1993) pp. 5226–5229, Part 1, No. 11B. Nov. 1993.

Hiroko Iwasaki et al. "Completely Erasable Phase Change Optical Disk", Jpn. J. Appl. Phys. vol. 31 (1992) pp. 461–465 Part 1, No. 2B, Feb. 1992.

INPUT SIGNAL n'= 1

TOTAL (n−n')T=2T n'= 2

TOTAL 1T n'= 3

PHASE-CHANGE TYPE OPTICAL RECORDING AND REPRODUCING METHOD

This application is a division of application Ser. No. 08/631,327 filed Apr. 12, 1996.

FIELD OF THE INVENTION

The present invention relates to a data recording/regenerating method and a data recording/regenerating apparatus for recording data in and regenerated data from a data recording medium such as a compact disk in which rewriting of data is possible, and a data recording medium for the same.

BACKGROUND OF THE INVENTION

As one of data recording media for recording data therein by irradiating an electromagnetic wave, especially a laser beam or regenerating data a deleting data therefrom, so-called a phase change type of data recording medium making use of transition between a crystalline phase and a non-crystalline phase or between crystalline phases is well known. Especially in the phase change type of data recording medium, overwriting with a single beam, which is difficult in an electrophoto-magnetic memory, is possible, and it is more simple as compared to an optical system for a drive system for recording, regenerating and deleting data in and from an electrophoto-magnetic disk, so that recently active researching efforts are made in this field.

On the other hand, in recent years, in association with rapid popularization of CDs (compact disks), a postscript type of compact disk (CD-R) in which data can be written only once was developed, and has become popular in the market. In a case of the CD-R, however, if data writing fails even once, the data written in can not be modified and the disk become unavailable, and there is no way but to abort the disk. For this reason, a compact disk, in which rewriting of data is possible, has been longed for to overcome the defect of the CD-R as described above.

As an example of a compact disk which has been developed recently and in which rewriting of data is possible, there is a writable compact disk making use of an electrophoto-magnetic disk, but this type of compact disk has such defects as difficulty in overwriting and poor compatibility with a CD-ROM or a CD-R, so that recently efforts for commercializing the phase change type of optical disk, which is principally advantageous in securing compatibility, have become very active.

Examples of study report for a writable compact disk making use of a phase change type of optical disk include Furuya et al., Collection of Study Reports for 4-th Symposium by Phase Change Recording Research Society, 70 (1992); Jinno et al., Collection of Study Reports for 4-th Symposium by Phase Change Recording Research Society, 76 (1992); Kawanishi et al., Collection of Study Reports for 4-th Symposium by Phase Change Recording Research Society, 82 (1992); T. Handa et al. Jpn. J. Appl. Phys. 32 (1992) 5226; Yoneda et al., Collection of Study Reports for 5-th Symposium by Phase Change Recording Research Society, 9 (1993); Tominaga et al., Collection of Study Reports for 5-th Symposium by Phase Change Recording Research Society, 5(1993).

Any of these does not completely satisfy the demands for stable compatibility with a CD-R, a performance in deleting recorded data, recording sensitivity, allowable times of repeated writing, times of regeneration, stability during storage, and overall performance, and the facts are mainly due to composition of a material for recording, and a low deletion ratio because of the structure.

Under the circumstances, there has been a strong demand for development of a material for phase change recording suited for high sensitivity recording as well as for deletion of data, and furthermore for development of a high performance and writable phase change type of compact disk system.

Inventors of the present invention have discovered and disclosed recording materials based on an Ag—In—Sb—Te system as new material which can overcome the problems as described above. As the representative examples, it is possible to enumerate, for instance, Japanese Patent Laid-Open Publication No. 78031/1995, Japanese Patent Application Publication No. 123551/1992, H. Iwasaki et al.: Pn. J. Appl. Phys. 31 (1992) 461, Ide et al.: Collection of Study Reports for 3-rd Symposium by Phase Change Recording Research Society, 102 (1991), H. Iwasaki et al.: Pn. J. Appl. Phys. 32 (1993) 5241.

It is already clear that a phase change type of optical disk having an extremely excellent performance can be obtained with the disclosed technologies, but in order to obtain a phase change type of optical disk system which can completely satisfy the demands for compatibility with a CD-R and other overall performance as described above and can form a new market, it is necessary to furthermore improve the disclosed technologies described above. Especially in a case where PWM (Pulse Width Modulation) recording based on the EFM (Eight-to-Fourteen Modulation) system used for a compact disk is executed, a technology for repeatedly recording a long mark having only a small distortion under stable conditions is indispensable for improvement of a quantity of pulse modulation for recording as well as for insuring stability in repeated overwriting.

As a system for improving quality of pulse modulation for recording in phase change recording, various types of recording compensation system have been disclosed. For instance, Japanese Patent Laid-Open Publication No. 266632/1988 describes that a system, in which a long amorphous mark is recorded using a pulse array, is effective in PWM recording in a case where a recording film having a high crystallizing speed is used. Also in the inventions disclosed in Japanese Patent Laid-Open Publication No. 266633/1988 and in U.S. Pat. No. 5,150,351 Specification, jitter is improved by making higher laser energy in the head as well as in the end of a pulse array or by making longer a time for irradiation to suppress positional fluctuation of an edge section of a mark.

There has been known a method of recording data signals in an optical disk for use in an optical disk recording unit by irradiating a light spot such as a laser beam onto an optical disk for scanning and modulating amplitude of a light spot such as a laser beam with data signals as described in Japanese Patent Publication No. 29336/1988, and also there has been a method for adjusting recording conditions such as a recording power or a recording light pulse to optimal ones by way of regenerating data signals recorded in an optical disk and monitoring amplitude of the regenerated signals or length of recording marks.

With any of the technologies described above, it is impossible to simultaneously satisfy the demands for improvement of quality of pulse modulation for recording and stability in repeated overwriting.

Also with any of the technologies as described above, as a matter of fact it is impossible due to the reasons as described below to always set optimal conditions even by actually recording data signals using an optical disk recording unit produced in mass.

Namely, as an example of the method described above, the method can be enumerated in which an optimal recording power is set to each optical disk recording unit by monitoring amplitude of pulse modulation for recording (a difference between a level of a signal from a not-recorded section and that of a signal from a recorded section), which is a representative regenerated signal in an optical disk, but an amplitude value of pulse modulation for recording changes according not only to a recording power, but also to a number of openings in an optical pickup, rim intensity (distribution of intensity of an incident laser beam to a focusing lens), a size and a form of each light spot, and contamination of the optical system associated with passage of time, and generally offset by 20 to 40% is generated between each optical pickup, so that a set value is largely displaced from the optimal one because of the effect by the offset described above. So in an optical disk recording unit designed for mass production, it is extremely difficult to set an optimal recording power with a precision acceptable in actual use (around±5%).

Also there is nonuniformity between individual optical disk recording units that pulse modulation for recording for the same recording power can not be a constant level, and in this case minute adjustment of a recording power is required for each optical disk recording unit.

SUMMARY OF THE INVENTION

It is an object of the present invention to provide a data recording/regenerating method, a data recording/regenerating apparatus, and a data recording medium in which improvement of quality of pulse modulation for recording and stability in repeated overwriting can be achieved, improvement of reliability and versatility can be achieved, and an optimal recording power can easily be set.

To achieve the object described above, in a data recording/regenerating method as well as in a data recording/regenerating apparatus according to the present in which, by irradiating an electro-magnetic wave to a data recording medium to generate a phase change in a recording layer, data is recorded in and regenerated from the data recording medium, and also in which rewriting of data is possible, when recording data in the data recording medium by modulating signals according to the PWM recording system, pulse modulation for recording when recording or rewriting a signal having a prespecified signal width after modulation is a continuous electro-magnetic wave at a first power level; a record signal pulse array when recording or rewriting a 1 signal having a prespecified signal width after modulation is an electromagnetic wave pulse array comprising a pulse section having a first time width and a second power level, a multi-pulse section in which low level pulse each at a third power level having a time width totally equal to a clock time and high level pulses each at a fourth power level alternately appear at a prespecified duty ratio prespecified times, and a pulse section having a second time width and a fifth power level, and the first time width, the duty ratio, and the second time width are respectively set according to a linear velocity.

In other words, in the data recording/regenerating method in which, by irradiating an electro-magnetic wave to a data recording medium to generate a phase change in a recording layer thereof, data is recorded in and regenerated from said data recording medium, and also in which rewriting of data is possible; when recording data in said data recording medium by modulating signals according to the PWM recording system, pulse modulation for recording when recording or rewriting a 0 signal having a signal width of nT (T: Clock time) after modulation is a continuous electromagnetic wave at a power level e; a record signal pulse array when recording or rewriting 1 signal having a signal width of nT after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d,; x, y, and z satisfy the relations of $0.5\ T \leq x \leq 2\ T$, $0.4 \leq y \leq 0.6$, and $0.5\ T \leq z \leq 1\ T$; n' is an integer equal to or smaller than n ($n' \leq n$); and also controls are provided so that the relation of (a and c )>e>(b and d) is satisfied.

Also a data recording medium used in the data recording/regenerating method as well as in the data recording/regenerating apparatus as described above comprises at least a substrate, a heat-resisting protection layer, and a recording layer, and the recording layer is composed of Ag, In, Sb, and Te as the main constituent elements.

Other objects and features of this invention will become understood from the following description with reference to the accompanying drawings.

DESCRIPTION OF THE PREFERRED EMBODIMENTS

Figure 14:
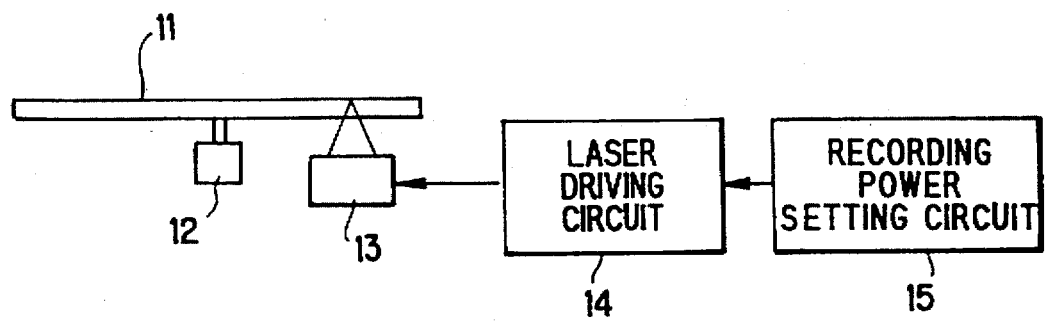
FIG. 14 is a block diagram showing a portion of the embodiment described above.

FIG. 1 schematically shows a pulse wave form of pulse modulation for recording in embodiments of a phase change type of data recording/regenerating apparatus according to the present invention as an example of a 4 T signal. In this embodiment, as shown in FIG. 14, a phase change data recording medium 11 comprising a phase change of type optical disk is rotated and driven by a driving means 12 comprising a spindle motor, a phase change is generated in a recording layer of the data recording medium by driving a light source comprising a semiconductor laser with a laser driving circuit 14 as a light source in a pickup 13 for regenerating data and by irradiating a laser beam as an electromagnetic wave to the data recording medium 11 from the semiconductor laser through an optical system which is not shown, and a reflected light from the data recording medium 11 is received by the pickup 13 for regenerating data and the data is recorded in and regenerated from the data recording medium 11. An optimal recording power in the pickup 13 for regenerating data is set by a recording power setting circuit 15 as a recording power setting means.

As described above, the present embodiment is a phase change type of data recording/regenerating apparatus in which, by irradiating a laser beam as an electromagnetic wave to the phase change type of data recording medium 11 with a pickup 13 for regenerating data to generate a phase change in a recording layer of the data recording medium 11, data is recorded in and regenerated from the data recording medium 11, and also in which data is writable; and the apparatus comprises a recording means for recording data in the data recording medium with the pickup 13 for regenerating data by modulating a signal to be recorded by a modulating section. The recording means including the pickup 13 records data according to so called the PWM recording system in which marks are recorded so that a signal is recorded as a width of a mark in a recording layer of the data recording medium. The recording means modulates signals to be recorded by using a clock in a modulating section, for instance, according to the EFM (Eight-to-Fourteen Modulation) modulating system or the improved system thereof suited for recording data for a rewriting type of compact disk.

Figure 1A:
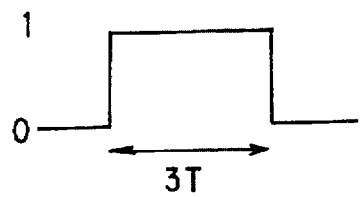
FIGS. 1A to 1D are wave forms view schematically showing a pulse wave form of pulse modulation for recording in embodiments of the present invention as an example of a 3 T signal in a case of n'=1, 2, 3, respectively.
Figure 1B:
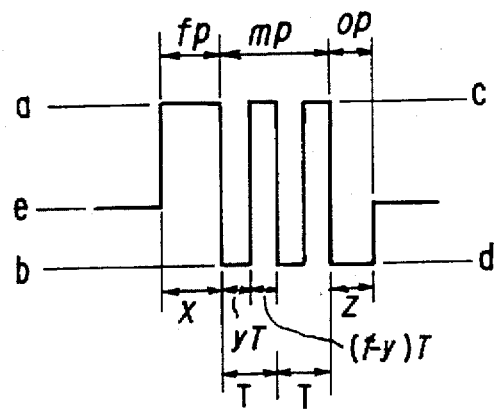
Figure 1C:
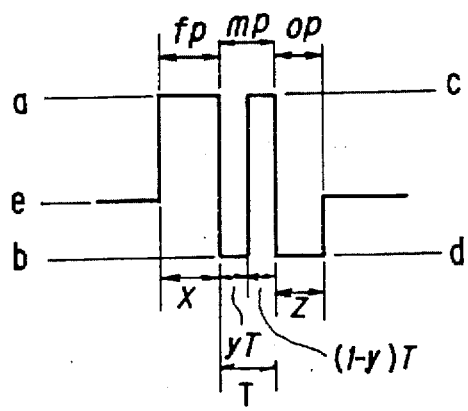
Figure 1D:
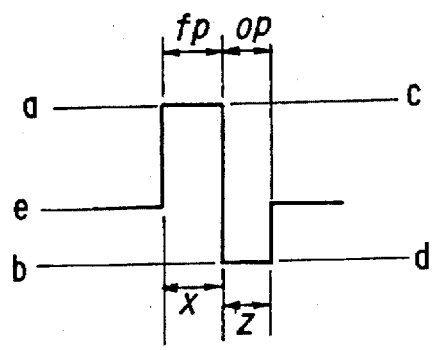

In the recording means, in recording data according to the PWM recording system, pulse modulation for recording when recording or rewriting a 0 signal having a signal width of nT (n: Prespecified value, T: Clock time: a time corresponding to a cycle of a clock used for modulation of a signal) after modulation is a continuous electromagnetic wave at a power level e; a record signal pulse array when recording or rewriting 1 signal having a signal width of nT after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d; x, y, and z satisfy the relations of $0.5\,T \leq x \leq 2\,T$, $0.4 \leq y \leq 0.6$, and $0.5\,T \leq z \leq 1\,T$; n is an integer not less than 1; n' is an integer equal to or smaller than n ($n' \leq n$); and also the relation of (a and c)>e>(b and d) is satisfied. FIG. 1B is a view in a case of n'=1, FIG. 1C is a view in a case of n'=2, and FIG. 1D is a view in a case of n'=3.

Generally, 1 signal (corresponding to '1' of a binary signal) in a phase change type of data recording medium is recorded by forming an amorphous section (amorphous phase) on a recording layer of the phase change type of data recording medium. It is required for forming an amorphous phase on the recording layer thereof that a temperature of the recording layer is higher than a melting point thereof and a speed for cooling it down thereafter is sufficient. With this feature, in the pulse section fp, a header section of a recording mark is formed by raising a temperature of a recording layer of the phase change type of data recording medium, in the multi-pulse section mp an intermediate section of the recording marks is formed by raising a temperature of the recording layer thereof, and in the pulse section op a rear edge section of the recording marks is formed by cooling down the recording layer thereof. If a linear speed for a phase change type of data recording medium is varied, an irradiating rate of an electromagnetic wave to the data recording medium thereof is changed, whereby a temperature of the recording layer becomes higher than the melting point thereof and a speed for cooling it down thereafter is changed, thus it is effective to suitably raise a temperature of the recording layer to a level higher than the melting point and set a speed for cooling it down thereafter by varying a linear speed for the phase change type of data recording medium.

On the other hand, in a case where data is recorded in a phase change type of data recording medium in the PWM system, data is held in an edge section of recording marks, so that it should suppress an effect due to a heat over a portion other than a portion of the recording layer in which data is recorded to avoid a border between a recorded section and not-recorded section on the recording layer from becoming unclear or the recorded section from being deleted by being crystallized.

As described above, in order to clearly differentiate a condition for rising a temperature in a portion to be recorded of the recording layer, in which a temperature should be up, from that in a portion thereof in which a room temperature should be kept, it is effective to avoid generation of excessive heat in the recording layer as well as to suppress heat conduction in the film of the recording layer to a low level. With this feature, it is possible to make a border between the recorded section and not-recorded section clear, and to obtain pulse modulation for recording which has small jitters and a better quality. The recording means used for pulse modulation for recording shown in FIG. 1, which makes it possible to obtain recording conditions optimal for satisfying these conditions, and to stably record and rewrite recording marks of better quality when data is recorded in a recording layer of the phase change type of data recording medium in the PWM. Herein an optimal recording conditions are as follows: x, y, and z satisfy the relations of $0.5\,T \leq x \leq 2\,T$, $0.4 \leq y \leq 0.6$, and $0.5\,T \leq z \leq 1\,T$; and also the relation of (a and c)>e>(b and d) is satisfied.

As described above, in the data recording/regenerating method according to the present invention in which, by irradiating an electro-magnetic wave to a data recording medium to generate a phase change in a recording layer, data is recorded in and regenerated from the data recording medium, and also in which data is writable; in recording data in the data recording medium by modulating signals according to the PWM recording system, pulse modulation for recording when recording or rewriting a 0 signal having a signal width of nT (T: Clock time) after modulation is a continuous electromagnetic wave at a power level e; a record signal pulse array when recording or rewriting 1 signal having a signal width of nT after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d; x, y, and z satisfy the relations of $0.5\ T \leq x \leq 2\ T$, $0.4 \leq y \leq 0.6$, and $0.5\ T \leq z \leq 1\ T$; n' is an integer equal to or smaller than n ($n' \leq n$); and also the relation of (a and c)>e>(b and d) is satisfied, so that a signal of better quality can stably be recorded and rewritten in the method of recording data in the phase change type of data recording medium in the PWM recording system.

In the data recording/regenerating apparatus according to present invention in which, by irradiating an electromagnetic wave to a data recording medium to generate a phase change in a recording layer, data is recorded in and regenerated from the data recording medium, and also in which data is writable; the apparatus comprises a recording means for recording data in the data recording medium by modulating signals according to the PWM recording system, and in the recording means, pulse modulation for recording when recording or rewriting a 0 signal having a signal width of nT (T: Clock time) after modulation is a continuous electromagnetic wave at a power level e; a record signal pulse array when recording or rewriting 1 signal having a signal width of nT after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d; x, y, and z satisfy the relations of $0.5\ T \leq x \leq 2\ T$, $0.4 \leq y \leq 0.6$, and $0.5\ T \leq z \leq 1\ T$; n' is an integer equal to or smaller than n ($n' \leq n$); and also the relation of (a and c)>e>(b and d) is satisfied, so that a signal of better quality can stably be recorded and rewritten in the apparatus for recording data in the phase change type of data recording medium in the PWM recording system.

In the data recording/regenerating method according to the present invention, a system of modulating a signal to be recorded is the EFM modulating system or an improved system thereof and n' is 2 (n'=2), so that it is possible to provide a recording method suited to a writable type of compact disk.

In the data recording/regenerating apparatus according to the present invention, the recording means modulates a signal to be recorded according to the EFM modulating system or the improved modulating system thereof and n' is 2 (n'=2), so that it is possible to provide a recording apparatus suited to a writable type of compact disk.

In the embodiment described above, it is desirable to decide x, y, and z according to an amplitude of a reflected light from the phase change type of data recording medium to obtain more suited recording conditions. In the embodiment of the data recording/regenerating apparatus according to the present invention, the apparatus comprises a means for deciding x, y, and z, and a power level for a regenerating light for regenerating a signal according to an amplitude of a reflected light when regenerating data from the data recording medium, so that it is possible to obtain an optimal record signal pulse wave form.

As described above, in the data recording/regenerating method according to the present invention; x, y and z, and a power level for an electromagnetic wave for regenerating a signal are decided according to an amplitude of a reflected light when regenerating data from the data recording medium, so that it is possible to obtain an optimal record signal pulse wave form in the method of recording data in the phase change type of data recording medium in the PWM system.

In the data recording/regenerating apparatus according to the present invention comprises a mean for deciding x, y and z, and a power level for an electromagnetic wave for regenerating a signal according to an amplitude of a reflected light when regenerating data from the data recording medium, so that it is possible to obtain an optimal record signal pulse wave form in the apparatus for recording data in the phase change type of data recording medium in the PWM system.

In the embodiment of the phase change type of data recording apparatus according to the present invention, the apparatus comprises a recording means for recording data in the data recording medium by modulating signals according to the PWM recording system, and a recording control means for controlling the recording means; and the recording means records signal by modulating signals in the modulating section and by recording the data in the data recording medium with a pickup 13 for recording/regenerating data.

In the recording control means, by controlling the recording section, pulse modulation for recording when recording or rewriting a 0 signal having a signal width of nT (T: Clock time) after modulation is a continuous electromagnetic wave at a power level e; a record signal pulse array when recording or rewriting 1 signal having a signal width of nT after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d; x, y, and z satisfy the relations of $0.5\ T \leq x \leq 2\ T$, $0.4 \leq y \leq 0.8$, and $0.5\ T \leq z \leq 1\ T$; n' is an integer equal to or smaller than n ($n' \leq n$); and also the relation of (a and c)>e>(b and d) is satisfied; and at the same time a time width x, a duty ratio y, and a time width z are respectively set according to a linear speed.

As described above, in the data recording/regenerating method according to the present invention in which, by irradiating an electromagnetic wave to a data recording medium to generate a phase change in a recording layer, data is recorded in and regenerated from the data recording medium, and also in which data is writable; in recording data in the data recording medium by modulating signals according to the PWM recording system, pulse modulation for recording when recording or rewriting a signal having a prespecified signal width after modulation is a continuous electromagnetic wave at a first power level e; a record signal pulse array when recording or rewriting a 1 signal having a prespecified signal width of nT after modulation is an electromagnetic wave pulse array comprising a pulse section fp having a first time width of x and a second power level a, a multi-pulse section mp in which low level pulses each at a third power level b having a time width of T totally equal to a clock time and high level pulses each at a fourth power level c alternately-appear at a prespecified duty ratio of y prespecified times (n–n') times, and a pulse section op having a second time width of z and a fifth power level d; and the first time width of x, the duty ratio of y, and the second time width of z are respectively set according to a linear speed, so that a signal of better quality can stably be recorded and rewritten in the method of recording data in the phase change type of data recording medium in the PWM recording system.

In the data recording/regenerating apparatus according to the present invention in which, by irradiating an electromagnetic wave to a data recording medium to generate a phase change in a recording layer, data is recorded in and regenerated from the data recording medium, and also in which data is writable; the apparatus comprises a recording means for recording data in a data recording medium by modulating signals according to the PWM recording system, and a recording control means for controlling the recording means; and in the recording control means, pulse modulation for recording when recording or rewriting a 0 signal having a signal width of nT (T: Clock time) after modulation is a continuous electromagnetic wave at a power level e; a record signal pulse array when recording or rewriting 1 signal having a signal width of nT after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d; x, y, and z satisfy the relations of $0.5\ T \leq x \leq 2\ T$, $0.4 \leq y \leq 0.8$, and $0.5\ T \leq z \leq 1\ T$; n' is an integer equal to or smaller than n ($n' \leq n$); and also the relation of (a and c)>e>(b and d) is satisfied, so that a signal of better quality can stably be recorded and rewritten in the apparatus for recording data in the phase change type of data recording medium in the PWM recording system.

Data is recorded in or regenerated from a compact disk (CD-R) in which recording of data is possible by generally using a pickup having a wave length of 780 nm and NA of 0.5, and if a converted value, in a case where an amplitude of a reflected light from the phase change type of data recording medium is converted to a reflectance by using the pickup, is low, it is desirable that a value of x is smaller, while the converted value is higher, it is desirable that the value of x is larger. More specifically, it is more advantageous that a value of x is, if a reflectance from the data recording medium is in a range from around 10% to 15%, in a range from 0.5 T to 1 T, from 0.75 T to 1.25 T if the reflectance therefrom is in a range from around 15% to 20% from 1 T to 15 T if the reflectance therefrom is in a range from around 20% to 25%, and from 1.25 T to 2 T if the reflectance therefrom is in a range from around 25% to 30%. A disk for CD-R correction provided by Phillips Consumer Electronics is used herein for correction of a reflectance from the data recording medium, but in a drive system in which data can actually be recorded in or regenerated from the data recording medium, and also in which data is writable, it is not required to convert an amplitude of a reflected light from the phase change type of data recording medium to a reflectance, and also it is possible to control x only by adjusting an amplitude of a reflected light from the phase change type of data recording medium.

Figure 2:
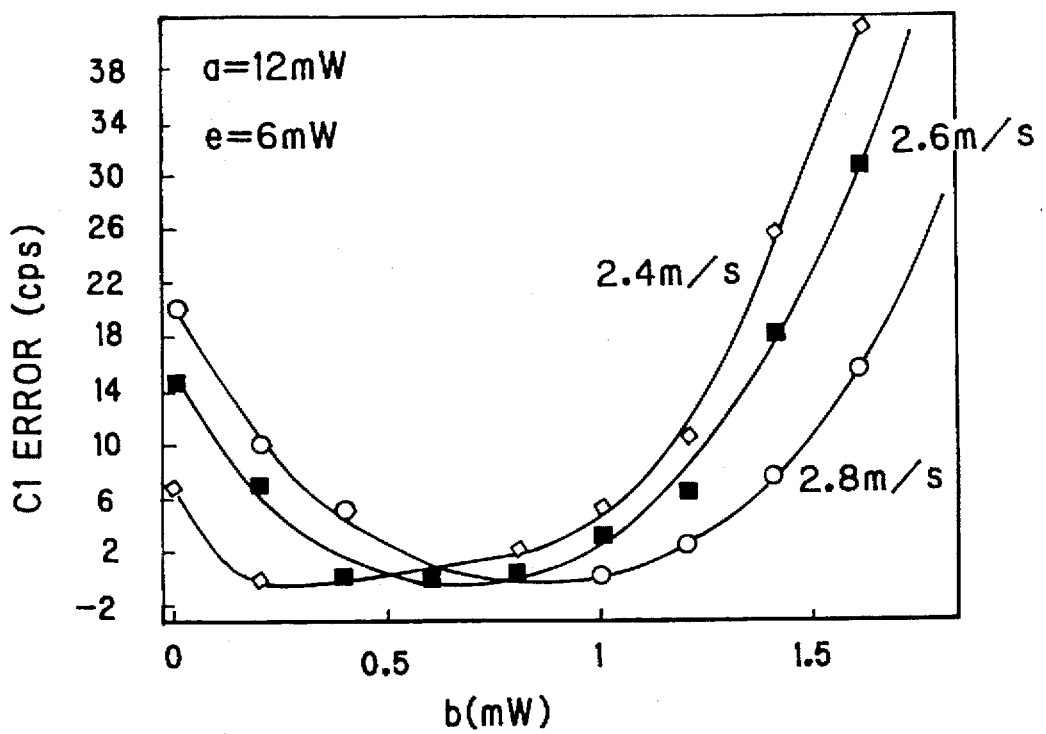
FIG. 2 is a characteristic view showing a relation between b and C1 error in a case of b=d in the embodiments of the present invention.

FIG. 2 shows a relation between b in a case of b=d and a C1 error (Error in CD standards). It is found therefrom that a suited value of b is present according to an error ratio of C1 error. If a value of b is too large, stable amorphous marks can not be generated in the data recording medium because conditions for abrupt cooling for the data recording medium are lost. On the contrary, if a value of b is too small, it is difficult to raise a temperature, so that it becomes hard to generate amorphous marks in the data recording medium with identical a, c or e, which brings a trouble relating to the sensitivity. Accordingly, a linear speed for a data recording medium when data is recorded, an environment for use thereof, a structure of abrupt cooling or heating thereof, and dispersions in forming beams irradiated to a data recording medium in a pickup make different suited values for b and d, but it is effective to make adjustment of values of b and d to obtain high-reliability recording conditions by correcting these dispersions.

In an embodiment of the data recording/regenerating apparatus according to the present invention, the data recording/regenerating apparatus comprises a means for detecting a C1 error and deciding b and d substantially according to the C1 error, so that high-reliability signals can be recorded.

As described above, in the embodiment of the present invention, the data recording/regenerating method detects an error and decides b and d substantially according to the error, so that it is possible to provide a high-reliability signal recording method.

In an embodiment of the present invention, the data recording/regenerating apparatus according to the present invention comprises a means for detecting an error and deciding b and d substantially according to the error, so that it is possible to provide a high-reliability signal recording apparatus.

In the embodiment of the data recording/regenerating apparatus according to the present invention, and in the embodiment described above, the data recording/regenerating apparatus comprises a detecting means for detecting a signal from the data recording medium when regenerating data from the data recording medium; a DC coupling means for subjecting a signal detected by this detecting means to DC coupling; and a means for computing the following expression (1) from the high level I1 in an output level from this DC coupling means and the low level I2 thereof and deciding a and/or c substantially according to the m.

$$m = (I1 - I2)/I1 \times 100 \quad (1)$$

Figure 3:
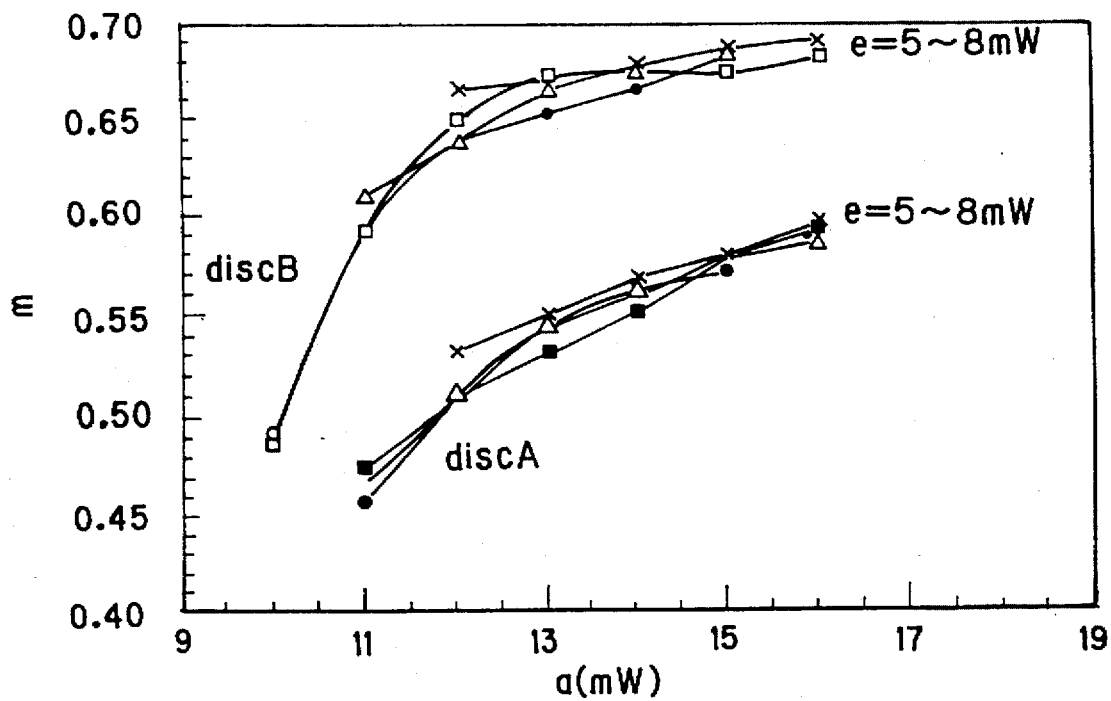
FIG. 3 is a characteristic view showing a relation between m, and a and e in a case of a=c in the embodiments of the present invention.

FIG. 3 shows a relation among m expressed by the expression (1), a, and e in a case where a is equal to c (a=c). From this figure, it is understood that m depends mainly on a only, and little on e. Also it is understood from this figure that it is possible to select a and b each having an adequate signal amplitude by detecting m and also to obtain an optimal recording power including few errors, which makes it possible to realize a fully reliable system. Although an optimal value of m depends on system configuration, m equal to or larger than 0.5 ($m \leq 0.5$) is suited for high reliability, or a low error rate.

Thus in the embodiment of the present invention, a signal detected by a detecting means from a data recording medium when data is regenerated from the data recording medium is subjected to DC coupling, $m = (I1 - I2)/I1 \times 100$ is computed from a high level I1 and a low level I2 in an output level of this DC coupling, and a and/or c are decided according to this m in the data recording/regenerating method, so that an optimal recording power can be obtained in a method of recording data in a phase change type of data recording medium according to the PWM recording system.

In the embodiment of the present invention, the data recording/regenerating apparatus comprises a detecting means for detecting a signal from a data recording medium when data is regenerated from a data recording medium; a DC coupling means for subjecting a signal detected by this detecting means to DC coupling; and a means for calculating m=(I1−I2)/I1×100 from the high level I1 and low level I2 in an output level from this DC coupling means and substantially deciding a and/or c from this m, so that an optimal recording power can be obtained in an apparatus for recording data in a phase change type of data recording medium according to the PWM recording system.

In the embodiment of the data recording/regenerating apparatus in which inventions, the data recording/regenerating apparatus comprises a detecting means for detecting a signal from a data recording medium when data is regenerated from the data recording medium, an AC coupling means for subjecting a signal detected by this detecting means to AC coupling, and a means for computing $$\beta=(S1+S2)/(S1-S2)\times 100 \qquad (2)$$

from the high level S1 and low level S2 in an output level of this AC coupling and substantially deciding e and/or a and c from this $\beta$.

Figure 4:
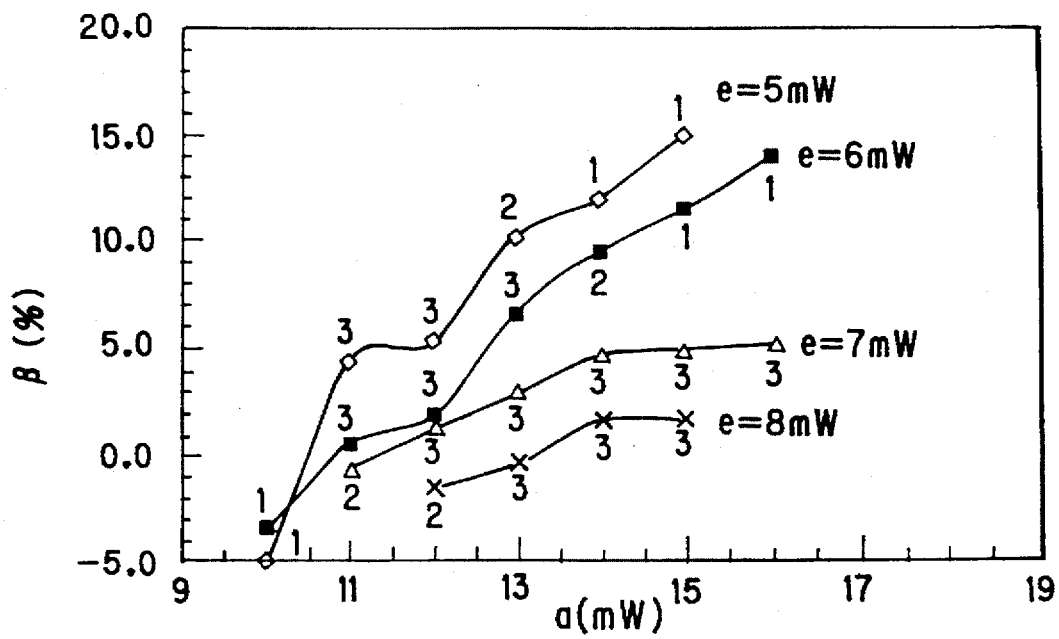
FIG. 4 is a characteristic view showing a relation between β, and a and e in a case of a=c in the embodiments of the present invention.

FIG. 4 shows a relation among $\beta$ expressed by the expression (2), a and e in a case where a is equal to c (a=c). From this figure, it is understood that $\beta$ depends on both a and e. Also FIG. 4 shows the stability in repeatedly overwriting maintaining a numerical value for low jitter, and also shows that, as the numerical value is larger, the times when overwriting can be repeated is also large. Also it is understood from this figure that it is possible to decide values of a, c and e, which are applicable for actual operation, for realizing the optimal overwriting performance with an optimal recording power and the system reliability by detecting $\beta$.

It is preferable that $\beta$ is in a range from −2 to 10, more preferably in a range from 0 to 8, and most preferably in a range from 2 to 7. The relation between $\beta$ and e is analogous to the relation between asymmetry computed from amplitude of a 3 T signal as well as of a 11 T signal and e, and for this reason $\beta$ can be substituted by the asymmetry. From a view point of system configuration, it is easier to detect amplitude of the 11 T signal than to detect amplitude of the 3 T signal, so it is desirable to use $\beta$.

In some types of data recording medium, dependency of $\beta$ on a may be dull, but the dependency on e is always high. From this fact, it can be conceived that substantially deciding a and/or c depending on a value of m and then deciding e depending on the value of $\beta$ is more suited for realization of optimal overwriting performance and maintenance of the system reliability. Also in actual systems, when controlling the parameters of a to e, the same effect can be achieved also by using other parameters such as e/a or e/c, and no problems occur.

As described above, in the data recording/regenerating method according to the present invention, a signal detected by the detecting means from a data recording medium when data is regenerated from the data recording medium is subjected to AC coupling; $\beta=(S1+S2)/(S1-S2)\times 100$ is computed from the high level S1 and low level S2 in an output level of this AC coupling, and e and/or a and c are decided according to this $\beta$, so that an optimal recording power can be obtained in a method for recording data in a phase change type of data recording medium according to the PWM recording system.

The data recording/regenerating apparatus according to the present invention comprises a detecting means for detecting a signal from a data recording medium when data is regenerated from the data recording medium, an AC coupling means for subjecting a signal detected by this detecting means to AC coupling, and a means for computing $\beta=(S1+S2)/(S1-S2)\times 100$ from the high level S1 and low level S2 in an output level of this AC coupling and substantially deciding e and/or a and c from this $\beta$, so that an optimal recording power can be obtained in an apparatus for recording data in a phase change type of data recording medium according to the PWM recording system.

In the data recording/regenerating method according to the present invention, a power level of an electro-magnetic wave is controlled so that $\beta$ is in a range from −2 to 10 for recording or rewriting signals, and for this reason an optimal recording power with high reliability can be obtained in overwriting.

Also, the data recording/regenerating apparatus according to the present invention comprises a means for controlling a power level of an electro-magnetic wave so that $\beta$ is in a range from −2 to 10 for enabling signal recording and/or signal rewriting, and for this reason an optimal recording power, so that an optimal recording power with high reliability can be obtained in overwriting.

The data recording/regenerating apparatus according to the present invention comprises a means for controlling a power level of an electro-magnetic wave so that e/a or e/c is in a range from 0.3 and 0.7 for enabling data recording and/or data rewriting, so that an optimal recording power can be obtained like in the other embodiments described above.

As described above, in the data recording/regenerating method according to the present invention, a power level of an electro-magnetic wave is controlled so that e/a or e/c is in a range from 0.3 to 0.7 for enabling signal recording and/or signal rewriting, and for this reason an optimal recording power can be obtained in the method of recording data in a phase change type of data recording medium according to the PWM recording system.

The data recording/regenerating apparatus according to the present invention comprises a means for controlling a power level of an electro-magnetic wave so that e/a or e/c is in a range from 0.3 to 0.7 for enabling signal recording and/or signal rewriting, and for this reason, an optimal recording power can be obtained in an apparatus for recording data in a phase change type of data recording medium according to the PWM data recording medium.

In the data recording/regenerating apparatus according to the present invention, a data recording medium is rotated by a rotation driving means at a rotational speed in terms of CD-referenced linear speed in a range from 1.2 or 1.4 m/s (CD equivalent speed) to 4.8 or 5.6 m/s (CD quadrupled speed). By setting a rotational speed of a data recording medium in the linear speed range, it is possible to realize the compatibility with the conventional type of CD systems (systems for recording data in or regenerating data from a CD). In recent years, especially in the field of CD-rom players, a data recording medium rotated at a high linear speed 2 times or more higher than a rotational speed of a CD-ROM has been used, but on the other hand, in the fields related to music or moving pictures (Video-CD), the basic demand is for real time regeneration, so that a data recording medium rotated at the same rotational speed as that of a CD is used.

As described above, in the data recording/regenerating apparatus according to the present invention, a data recording medium is rotated at a rotational linear speed in a range from 1.2 m/s to 5.6 m/s when data is recorded, so that recording conditions suited to a writable compact disk can be obtained.

The embodiment of the invention relates to a data recording medium used in the data recording/regenerating method according to the present invention or in the data recording/regenerating apparatus according to the present invention, and when data is recorded, the data recording medium is rotated at a rotational linear speed in a range from 1.2 m/s to 5.6 m/s, so that it is possible to provide a data recording medium suited for a writable compact disk.

A system in which rewriting of data is possible is used as a multi-media not requiring any specific type of data to be recorded therein, and can record, regenerate, and rewrite data in and from various types of CD. When recording data, or regenerating data, or rewriting data in the CD, it is inevitable to use a regenerating system in combination with a recording system operated at different linear speeds respectively, and for this reason a storage means for deleting a difference between a period of time required for regeneration and that for recording data is indispensable.

In the embodiment of data recording/regenerating apparatus, the storage means as described above consists mainly of semiconductor memories, and when regenerating music from a CD for music at real time while recording data with a system having a storage means and operated at a linear speed 2 times higher than that of a CD, it is possible to delete a difference between a period of time required for regeneration and that for recording data by temporally storing data to be recorded in the storage means.

As described above, the data recording/regenerating apparatus according to the present invention comprises a means for temporally storing a portion of data to be recorded, so that it is possible to improve the versatility and compatibility of a data recording medium used in a system using a phase change type of data recording medium as a writable compact disk and also to improve reliability of the system.

Also in a case where real time generation is not required like in editing a moving picture or the like, it is required that the period of time required for recording data is short, and at the same time for the same apparatus some times real time regeneration may be required at the same speed as that of a CD, and in this case, it is required in the system that a rotational speed of a data recording medium when data is recorded therein can be made higher than that of the data recording medium when data is regenerated.

So the data recording/regenerating apparatus according to the present invention comprises a means for making higher a rotational linear speed of a data recording medium when data is recorded than that when data is regenerated, and for this reason it is possible to improve versatility and compatibility of a system using a writable compact disk.

As described above, the data recording/regenerating apparatus according to the present invention comprises a means for making a rotational linear speed of a data recording medium when data is recorded than that when data is regenerated, so that it is possible to improve versatility and compatibility of a system using a writable compact disk.

Figure 5:
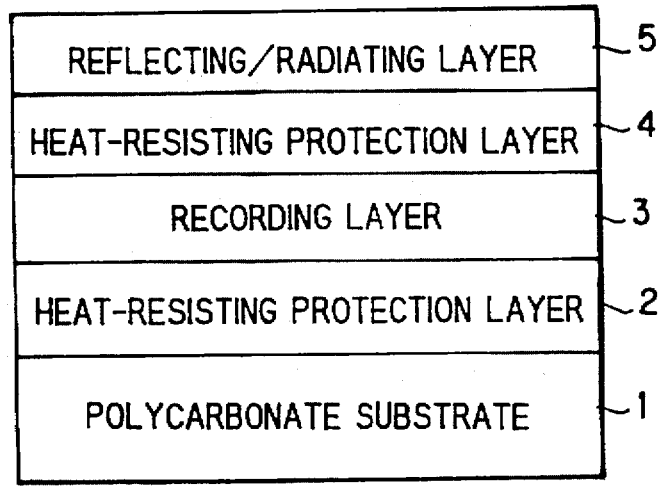
FIG. 5 is a cross sectional view showing a data recording medium according to the embodiments of the present invention.

FIG. 5 shows an embodiment of a data recording medium according to the present invention. The data recording medium is used in the embodiment described above, and a heat-resisting protection layer 2, a recording layer 2, a heat-resisting protection layer 4, and a reflecting/radiating layer 5 are provided sequentially in this order on a substrate 1. It is not always necessary to provide the heat-resisting protection layers 2, 4 in both sides of the recording layer 3, but in a case where the substrate 1 is made of a material having low resistance against heat such as polycarbonate resin, it is desirable to provide the heat-resisting protection layer 2.

The recording layer 3 contains Ag, In, Sb, and Te as the main constituent elements, and can be formed according to various types of gas-phase growth method such as the vacuum deposition method, sputtering method, plasma CVD method, optical CVD method, ion plating method, and electron beam deposition method. For forming the recording layer 3, in addition to the gas-phase growth method, a wet system process such as sol-gel method can also be applied. A film thickness of the recording layer 3 should be in a range from 100 to 1000 Å, and preferably in a range from 150 to 700 Å. If the film thickness is less than 100 Å, the light absorption performance of the recording layer 3 becomes remarkably low, and a function of a recording layer is lost. If the film thickness is larger than 1000 Å, homogenous phase change hardly occur at a high speed in the recording layer 3.

A material for the substrate 1 is generally glass or ceramics, or resin thereof, and a resin substrate is preferable because of its high moldability and low cost. Representative examples of the resin include polycarbonate resin, acryl resin, epoxy resin, polystyrene resin, acrylonitryl styrene copolymer resin, polyethylene resin, polypropylene resin, silicon-based resin, a fluorine resin, ABS resin, and urethane resin, and from a viewpoint of processability and optical characteristics, polycarbonate resin or acryl-based resin is preferable as a material for the substrate 1. A form of the substrate 1 may be of a disk, a card, or a sheet.

As materials for the heat-resisting protection layers 2 and 4, it is possible to enumerable metallic oxides such as SiO, $SiO_2$, ZnO, $SnO_2$, $Al_2O_2$, $TiO_2$, $In_2O_2$, MgO, or $ZrO_2$; a nitride such as $Si_2N_4$, AlN, TiN, BN, or ZrN; a sulfide such as ZnS, $In_2S_3$, and $TaS_4$; a carbide such as SiC, Tac, $B_4C$, WC, TiC, or ZrC; a diamond carbon or a mixture thereof. Any of these materials can itself be processed into a protection layer, but a mixture thereof may be used for the same purpose. Also impurities may be contained therein, if necessary. It should be noted, however, that a melting point of the heat-resisting protection layers 2, 4 should be higher than that of the recording layer 3.

The heat-resisting protection layers 2, 4 as described above can be formed according to various types of gas-phase growth method such as the vacuum deposition method, sputtering method, plasma-CVD method, optical CVD method, ion plating method, and electron beam deposition method. A film thickness of the heat-resisting protection layer 2 should preferably be in a range from 500 to 2500 Å, and more preferably in a range from 1200 to 2300 Å. If the film thickness is smaller than 500 Å, the heat-resisting protection layer 2 loses its function as a heat-resisting protection layer, and if the film thickness is larger than 2500 Å, the sensitivity may become dull, or interface separation may occur. Also the heat-resisting protection layer 2 may be formed to a multi-layered one, if necessary.

A film thickness of the heat-resisting protection layer 4 provided in the recording layer 3 should preferably be in a range from 100 to 1500 Å, and more preferably in a range from 150 to 1000 Å. If the film thickness is smaller than 100 Å, the heat-resisting protection layer 4 loses its function as a heat-resisting protection layer, and on the contrary if the film thickness is larger than 1500 Å, in a case where the data recording medium is used in the so-called low rotational linear speed of 1.2 to 5.6 m/s, such defects as low C/N or deletion ratio and increase in jitter may occur, which makes it impossible to obtain excellent performance of the data recording medium. Also the heat-resisting protection layer 4 may be formed into a multi-formed one, if required.

As a material for the reflecting/radiating layer 5, such metallic materials such as Al or Au, or an alloy thereof may be used. The reflecting/radiating layer 5 is not always required, but it is desirable to provide it to reduce thermal load to the data recording medium by emitting excessive heat to outside. The reflecting/radiating layer 5 as described above may be formed according to various types of gas-phase growth method such as the vacuum deposition method, sputtering method, plasma CVD method, optical CVD method, ion plating method, or electron beam deposition method. A film thickness of the reflecting/radiating layer 5 should preferably be in a range from 300 to 2000 Å, and more preferably in a range from 500 to 1500 Å.

As described above, the data recording medium according to the present invention is used in the data recording/regenerating method according to the present invention, or in the data recording/regenerating apparatus according to the present invention, and the data recording medium includes at least a substrate, a heat-resisting protection layer, and a recording layer, so that it is possible to provide an optimal data recording medium for recording data in a phase change type of data recording medium according to the PWM recording system.

Also in the data recording medium according to the present invention includes a reflecting/radiating layer, so that it is possible to provide an optimal data recording medium for recording data in a phase change type of data recording medium according to the PWM recording system.

Also in the data recording medium according to the present invention, the heat-resisting protection layers are provided in both sides of the recording layer so that they hold the recording layer between them, so that it is possible to provide an optical data recording medium for recording data in a phase change type of data recording medium according to the PWM recording system.

Also in the data recording medium according to the present invention, a film thickness of the heat-resisting protection layer provided between the substrate and the recording layer is in a range from 500 to 2500 Å, so that it is possible to provide an optimal data recording medium for recording data in a phase change type of data recording medium according to the PWM recording system.

Also in the data recording medium according to the present invention, in a case where the heat-resisting protection layer is provided on the recording layer, a film thickness of the heat-resisting protection layer is set in a range from 100 to 1500 Å, so that it is possible to provide an optimal data recording medium for recording data in a phase change type of data recording medium according to the PWM recording system.

Also in the data recording medium according to the present invention, main constituent elements of the recording layer are Ag, In, Sb and Te, so that it is possible to provide an optimal data recording medium for recording data in a phase change type of data recording medium according to the PWM recording system.

Also in the data recording medium according to the present invention, a film thickness of the recording layer is in a range from 100 to 1000 Å, so that it is possible to provide an optimal data recording medium for recording data in a phase change type of data recording medium according to the PWM recording system.

Also in the data recording medium according to the present invention, the substrate is made of such a material as glass, ceramics, or resin, so that it is possible to provide an optimal data recording medium for recording data in a phase change type of data recording medium according to the PWM recording system.

Also in the data recording method according to the present invention, a material for the heat-resisting protection layer is a metallic oxide such as SiO, $SiO_2$, ZnO, $SnO_2$, $Al_2O_2$, $TiO_2$, $In_2O_2$, MgO, or $ZrO_2$; a nitride such as $Si_2N_4$, AlN, TiN, BN, or ZrN; a sulfide such as ZnS, $In_2S_3$, and $TaS_4$; a carbide such as SiC, Tac, $B_4C$, WC, TiC, or ZrC; a diamond carbon or a mixture thereof, so that it is possible to provide an optimal data recording medium for recording data in a phase change type of data recording medium according to the PWM recording system.

Also in the data recording medium according to the present invention, the reflecting/radiating layer is made of a metallic material such as Al or Au, or an alloy thereof, so that it is possible to provide an optimal data recording medium for recording data in a phase change type of data recording medium according to the PWM recording system.

In the data recording medium according to the present invention, a film thickness of the reflecting/radiating layer is in a range from 300 to 2000 Å, so that it is possible to provide an optimal data recording medium for recording data in a phase change type of data recording medium according to the WPM recording system.

In the embodiments described above, as an electromagnetic wave used for recording data in, regenerating data from, or deleting data stored in a data recording medium, various types of electro-magnetic wave such as a laser beam, an electron beam, an X ray, a visual ray, an infrared ray, a ultraviolet ray, or a micro wave can be used, but in a case where the data recording medium is set in a data recording/regenerating apparatus, a laser beam generated by a small size and compact semiconductor laser is most preferable.

Next, a description is made for the present invention with reference to the embodiments. It should be noted that the embodiments are described herein only for description, and not for limiting the present invention in any sense.

The first embodiment of the present invention is an example of a data recording/regenerating apparatus, and the data recording medium using an Ag—In—Sb—Te system as a recording layer is rotated by a driving means at a rotational linear speed of 2.8 m/s, and an EFM modulated signal having a clock frequency of 8.64 MHz is recorded by a recording means in the data recording medium according to the PWM recording system. The pickup constitute a portion of the recording means, regenerating means and deleting means, a wavelength of a light wave generated by a semiconductor laser used in the pickup is 780 nm, and NA of the object lens used in the pickup is 0.5. In the data recording medium, a heat-resisting protection layer comprising a ZnS/$SiO_2$ layer and having a thickness of 180 nm, a recording layer made of Ag—In—Sb—Te and having a thickness of 18 nm, a heat-resisting protection layer comprising a ZnS/$SiO_2$ and having a thickness of 25 nm, and a reflecting/radiating layer made of an Al alloy and having a thickness of 100 nm, and a UV coat layer are provided on the substrate made of polycarbonate resin and having a thickness of 1.2 nm.

Figure 6:
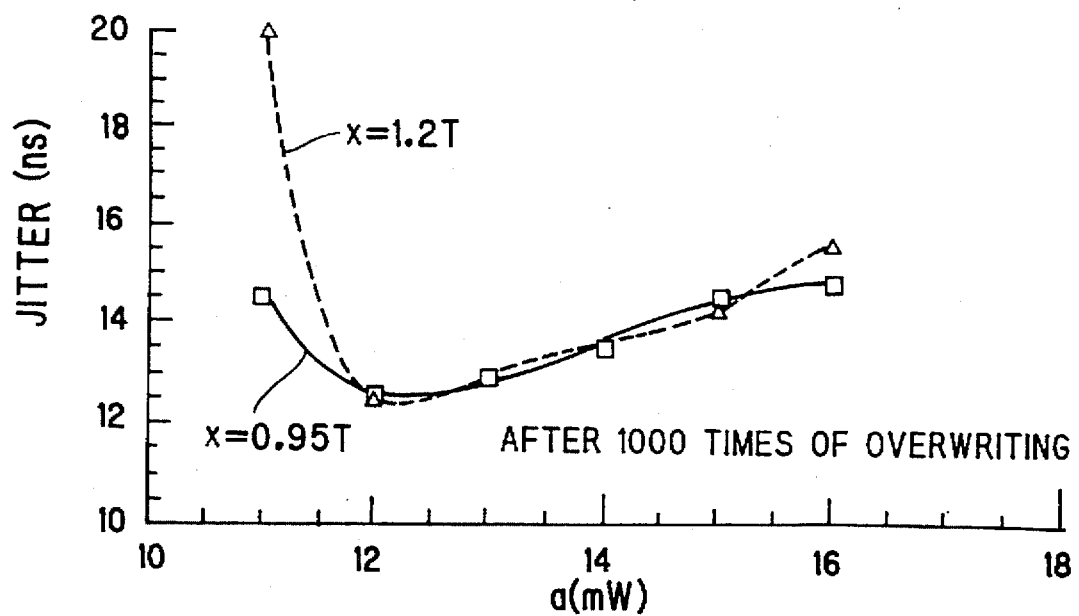
FIG. 6 is a characteristic view showing an effect given to a power margin of jitters after overwriting is repeated 1,000 times of x in the embodiments of the present invention.
Figure 7:
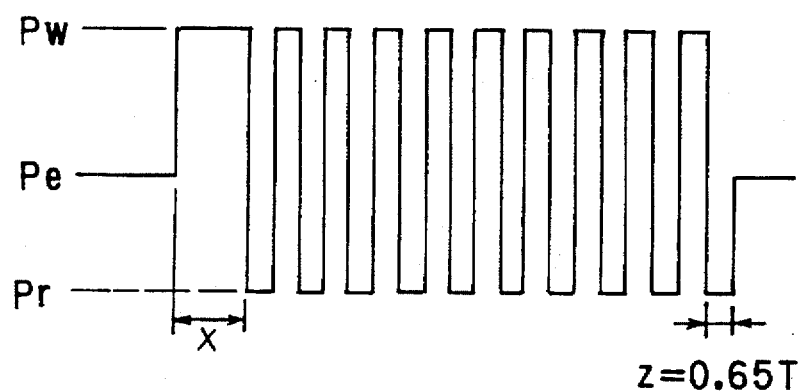
FIG. 7 is a wave form view showing an example of pulse modulation for recording in the embodiments of the present invention.

FIG. 6 shows influence by jitter over a power margin after overwriting of x shown in FIGS. 1A to 1D and FIG. 7 is repeated 1000 times. In this figure, parameters of pulse modulation for recording form are as follows: y=0.5, Z=0.65 T, b=1 mW (Pr), d=1 mW, e=6 mW (Pe), and n'=2. From this figure, it is understood that conditions for a wide margin can be obtained by setting x to an appropriate value and a system with high reliability in which overwriting can be repeated under stable conditions can be realized. It should be noted in FIG. 7 that Pw is equal to a as well as to c (Pw=a=c).

Figure 8:
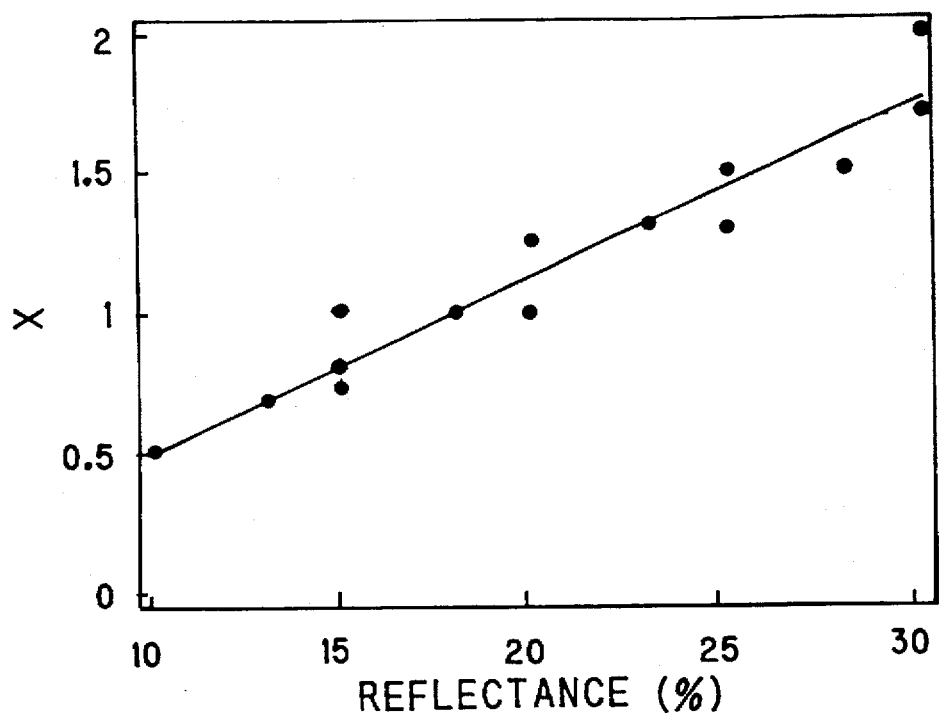
FIG. 8 is a characteristic view showing a relation between a reflectance computed from an amplitude of a reflected light from the data recording medium and a value of x in the embodiments of the present invention.

The second embodiment of the present invention is an example of a data recording/regenerating apparatus, and FIG. 8 shows a relation between a reflection factor computed from amplitude of reflected light from a data recording medium according to the second embodiment and an optimal value of x. In this embodiment, a disk for calibration of a CD-R supplied by Philips Consumer Electronics is used for calibration of a reflection factor.

The data recording apparatus used in the second embodiment is analogous to that used in the first embodiment, but a film thickness of each layer and a form of a groove in the substrate in the embodiment are different from those in the first embodiment, and also the reflection factor of the data recording medium is different from that in the first embodiment. The pickup for recording data in a data recording medium has a recording speed suited to various types of data recording medium like in the first embodiment.

A value of x in FIG. 8 is preferable for the best jitter, and also other parameters are suited to the data recording medium respectively. From this figure it is understood that there is a close relation between a reflection factor of a data recording medium and a preferable value of x, and that a value of x is preferably in a range from 0.75 T to 1.25 T if a reflection factor of a data recording medium is in a range from 10 to 15%, in a range from 0.5 T to 1 T if a reflection factor of the data recording medium is in a range from 15 to 20%, in a range from 1.25 T to 2 T if a reflection factor of the data recording medium is in a range from 25 to 30%. As described above, by detecting a reflection factor of a used data recording medium, it is possible to decide an optimal value of x.

Figure 9:
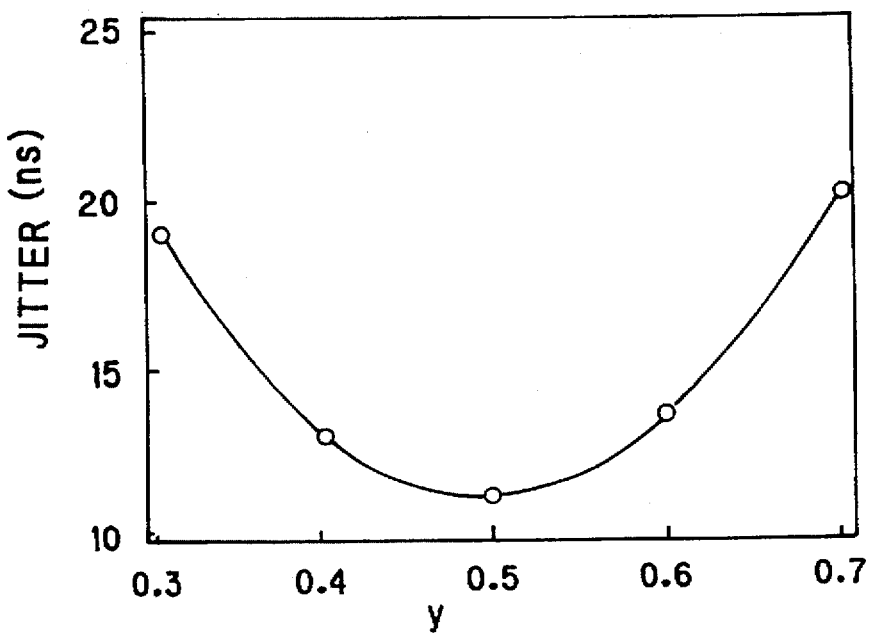
FIG. 9 is a characteristic view showing a relation between y and the jitters in the embodiments of the present invention.

The third embodiment of the present invention is an example of a data recording/regenerating apparatus, and FIG. 9 shows a relation between y in a case where the same data recording medium as that in the first embodiment is used and jitter. In the third embodiment, the pickup and the recording speed are the same as those in the first embodiment. Parameters of the pulse modulation for recording form in the embodiment are as follows: x=1 T, z=0.75 T, a=12 mW, b=1 mW (Pr), c=12 mW d=1 mW, e=6 mW, and n'=2. From this figure, it is understood that conditions for suppressing jitter at a low level can be obtained by selecting an appropriate value of y and thus a high reliability system can be realized.

Figure 10:
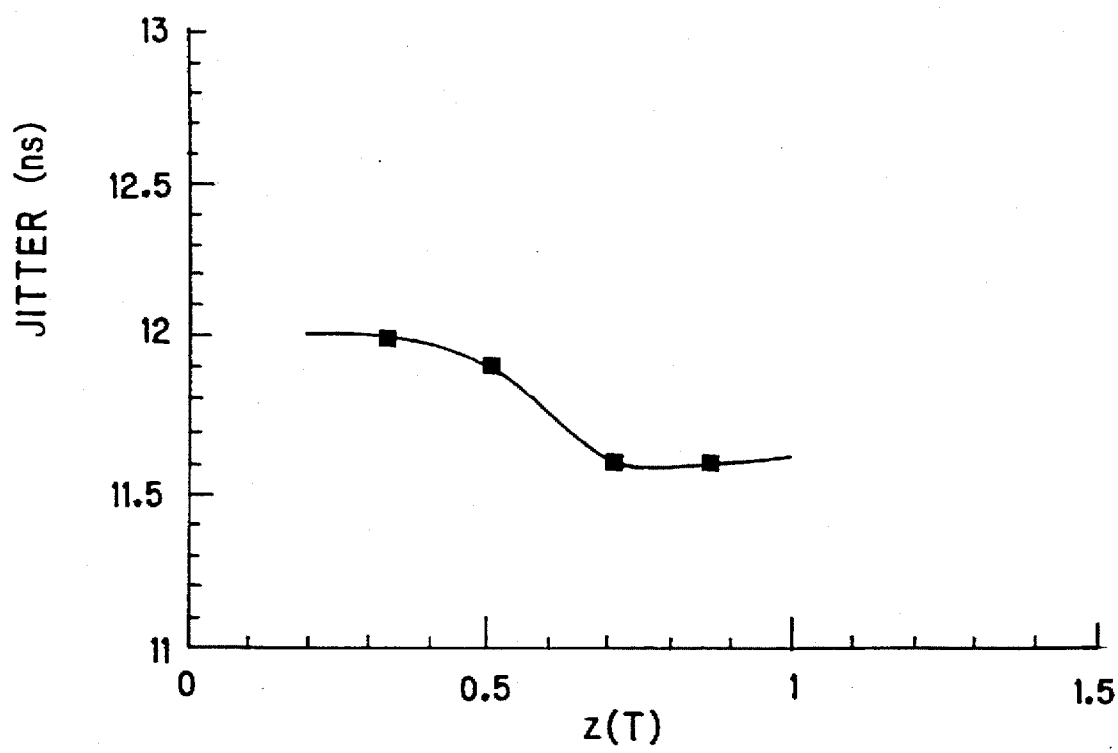
FIG. 10 is a characteristic view showing a relation between z and the jitters in the embodiments of the present invention.
Figure 11:
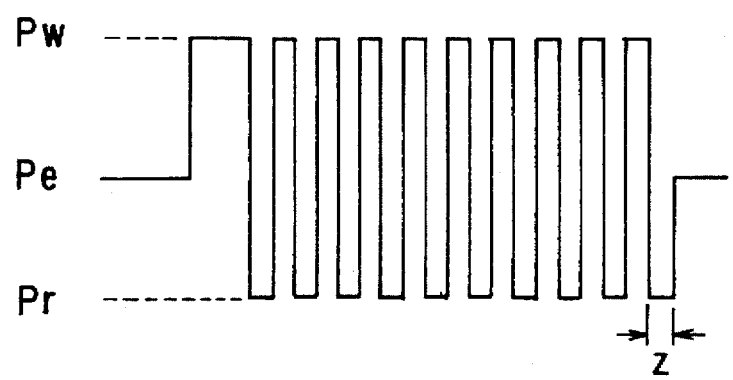
FIG. 11 is a wave form view showing an example of pulse modulation for recording in the embodiments of the present invention.

The fourth embodiment of the present invention is an example of a data recording/regenerating apparatus, and FIG. 10 shows a relation between a value of z and jitter in the fourth embodiment. In the fourth embodiment, the same data recording medium as that used in the first embodiment is used, and also the pickup and recording speed in this embodiment are the same as those in the first embodiment. Parameters of pulse modulation for recording form in this embodiment are as follows: X=2 T (Refer to FIG. 11), y=0.5, a=1.2 mW, b=1 mW (Pr), c=12 mW, d=1 mW, e=6 mW, and n'=2. From this figure, it is understood that conditions for suppressing jitter to a low level can be obtained by selecting an appropriate value of z and thus a high reliability system can be realized.

The fifth embodiment of the present invention is an example of the data recording/regenerating apparatus, and FIG. 4 shows a relation among stability in repeated overwriting, β, and a in a case where the same data recording medium as that in the first embodiment is used in this fifth embodiment. In FIG. 4, each figure indicates a power exponent of times when overwriting can be executed repeatedly. Namely, 3 indicates that overwriting can be repeated 1000 times or more, 2 indicates that overwriting can be repeated 100 times or more and less than 1000 times, and 1 indicates that overwriting can be repeated less than 100 times. As clearly shown in this figure, the performance for executing overwriting repeatedly can be obtained when β is in a range from −2 to 10.

The sixth embodiment of the present invention is an example of the data recording/regenerating apparatus, and shows a relation between a value of b and C1 error in this sixth embodiment. In the sixth embodiment, a data recording medium using an Ag—In—Sb—Te system therein as a recording layer is rotated by a driving means at each of rotational linear speeds of 2.8 m/s, 2.6 m/s, and 2.4 m/s, and an EFM modulated signal with a clock frequency of 8.64 MHz is recorded by a recording means in the data recording medium according to the PWM recording system. The data recording medium comprises a heat-resisting protection layer comprising a $ZnS/SiO_2$ layer having a thickness of 190 nm, a recording layer comprising an Ag—In—Sb—Te system having a thickness of 18 nm, a heat-resisting protection layer comprising a $ZnS/SiO_2$ layer having a film thickness of 25 nm, a reflecting/radiating layer made of an Al alloy and having a film thickness of 150 nm, and an UV coat layer, all of which are provided on a substrate made of polycarbonate resin layer.

A recording power is common at each rotational linear speed as follows: a=c=12 mW, e=6 mW, b=d, and n'=2. Also parameters of fp, mp, and op are set as follows: x=1 T, y=0.5, and z=0.75 T. If b is too large, conditions for cooling are lost, and a stable amorphous mark can not be recorded. On the contrary, if b is too small, it becomes difficult to raise temperature, and it becomes difficult to record data with the same a, c or e, which causes some problems related to the sensitivity. In this embodiment, not only by detecting an error, but also by controlling a value of b, an appropriate value of b can be obtained.

In the embodiment of the invention, in the data recording/regenerating method according to the present invention, data is recorded for testing in patterns each comprising a not-recorded section and a recorded section changing a recording power P from time to time by a recording means in a data recording medium, the data recorded for testing is regenerated by a regenerating means from the data recording medium, amplitude m of the pulse modulation for recording (a difference between a level of a regenerated signal from the not-recorded section and a level of a generated signal from the recorded section) corresponding to a recording power P from the regenerating means is monitored by a monitoring means, and a standardized gradation g (P) is computed by a recording power setting means through the following expression:

$$g(P)=(\Delta m/m)(\Delta P/P)$$

wherein ΔP is a minute change rate near P, and Δm indicates a minute change rate corresponding to ΔP near m, and whether the recording power is excessive or short is determined according to the standardized gradation g (P), thus an optimal recording power being decided and set.

In the data recording/regenerating method according to the present invention, data is recorded for testing in patterns each consisting of a not-recorded section and a recorded section changing a recording power P from time to time by a recording means in a data recording medium, the data recorded for testing by this recording means is regenerated by a regenerating means from the data recording medium, amplitude m of pulse modulation for recording (a difference between a level of a regenerated signal from the not-recorded section and a level of a generated signal from the recorded section) corresponding to the recording power P from the regenerating means is monitored by a monitoring means, the standardized gradation g (P) is computed by a recording power setting means through the following expression:

$$g(P) = (\Delta m/m)(\Delta P/P)$$

wherein ΔP is a minute change rate near P, and Δm indicates a minute change rate corresponding to ΔP near m, a particular value S selected from a range from 0.2 to 2.0 is set, a recording power P at which the standardized gradation g (P) coincides the S is detected, and an optimal recording power is set by multiplying Ps by a value in a range from 1.0 to 1.7.

In the embodiment, by using a ratio of change rates each standardized from a relation between amplitude m of pulse modulation for recording and a recording power P, it is possible to set an optimal power without being affected by offset of both m and P which easily occur in each data recording/regenerating apparatus, and especially it is possible to easily set an optimal recording power for a data recording/regenerating apparatus such as an optical disk device designed for mass production with an adequate precision (±5%). It should be noted that the recording power P as used herein indicates a power level of a or c in FIGS. 1A to 1D, and that a power level of e is a fixed value or may be set to a power level proportionate to a or c.

Next, a description is made for logical background of the embodiment of the invention. When amplitude $m_0$ of a standard pulse modulation for recording monitored by a standard data recording/regenerating apparatus and a standard recording power $P_0$ are given through the following expression:

$$m_0 = m_0(P_0),$$

a ratio $g_0$ ($P_0$) obtained by furthermore standardizing $\Delta m_0$ and $\Delta P_0$ corresponding to $m_0$ and $P_0$ respectively by $m_0$ and $P_0$ is expressed by the following expression as a function of $P_0$:

$$g_0(P_0) = (\Delta m_0/m_0)(\Delta P_0/P_0).$$

Herein $g_0$ ($P_0$) indicates a standardized gradation of $m_0$ against $P_0$, so that is called "standardized gradation".

An advantage of using this "standardized gradation" consists in the point that it is applicable also to a relation between amplitude m of a general pulse modulation for recording and a recording power P each offset from the respective standard given by the following expression:

$$m(P) = km_0(P), P = qP_0$$

k, q: Constants which are not zero. As clearly understood from the following expressions:

$$\begin{aligned} g(P) &= (\Delta m/m)/(\Delta P/P) \\ &= \{\Delta(km_0)/(km_0)\}/\{\Delta(qP)/(qP)\} \\ &= (\Delta m_0/m_0)/(\Delta P w/P w) = g_0(P_0), \end{aligned}$$

so far as the standardized gradation g (P) is monitored, always a value equal to the standard value $g_0$ ($P_0$) can be obtained.

In other words, a value of g (P) is a numerical value stored irrespective of whether m and p are offset or not, and for this reason it may be said that the numerical value always and accurately indicates whether a recording power is excessive or short. Accordingly, by setting a recording power P for recording data so that the standardized gradation value g (P) will be obtained in the data recording/regenerating apparatus, even if data is recorded with a different data recording/regenerating apparatus, always data can be recorded in the same recording conditions, which is quite convenient for applications in the industrial fields where importance is put on reproductivity of recorded data.

Naturally as a value of a recording power becomes larger, a value of m is saturated, and generally g (P) is converged to zero, and for this reason to more accurately detect whether a recording power is excessive of short, it is efficient to set a value of g (P) in a range from 0.2 to 2.0, more preferably in a range from 0.7 to 1.7 and get an optimal recording power by multiplying a value of P corresponding to this by a value in a range from 1.0 to 1.7, preferably in a range from 1.0 to 1.5.

Next, a description is made for a concrete method of obtaining a standardized gradation g.

The general expression for calculating a standardized gradation g is as follows:

$$g(P) = (\Delta m/m)(\Delta P/P)$$

wherein ΔP is a minute change rate near P, and Δm indicates a minute change rate corresponding to ΔP near m.

A practical expression for calculating a standardized gradation, when recording powers for i-th and (i+t)th test recording are p (i) and P (i+1) respectively, and amplitudes of the pulse modulation for recording are m (i) and (m+i) respectively, is as follows:

$$g[(P(i)+P(i+1)/2] = [\{(m(i+1)-m(i)\}/\{m(i+1)+m(i)\}]/[\{P(i+1)-P(i)\}/\{P(i+1)+P(i)\}].$$

Other practical expression for computing a standardized gradation g is, when recording powers for (i−1)th i-th, and (i+1)th test recording are P (i−1), P (i) and P (i+1) respectively, and amplitudes of pulse modulation for recording are m (i−1), m (i), and m (i+1) respectively, and at the same time when P (i)={P (i+1)+P (i−1)}/2, is as follows:

$$g(i) = [\{m\ i+1)-m(i-1)\}/\{(m(i+1)+m(i-1)\}]/[\{Pw(i+1)-Pw(i-1)\}/\{(Pw(i+1)+Pw(i-1)\}].$$

Figure 12:
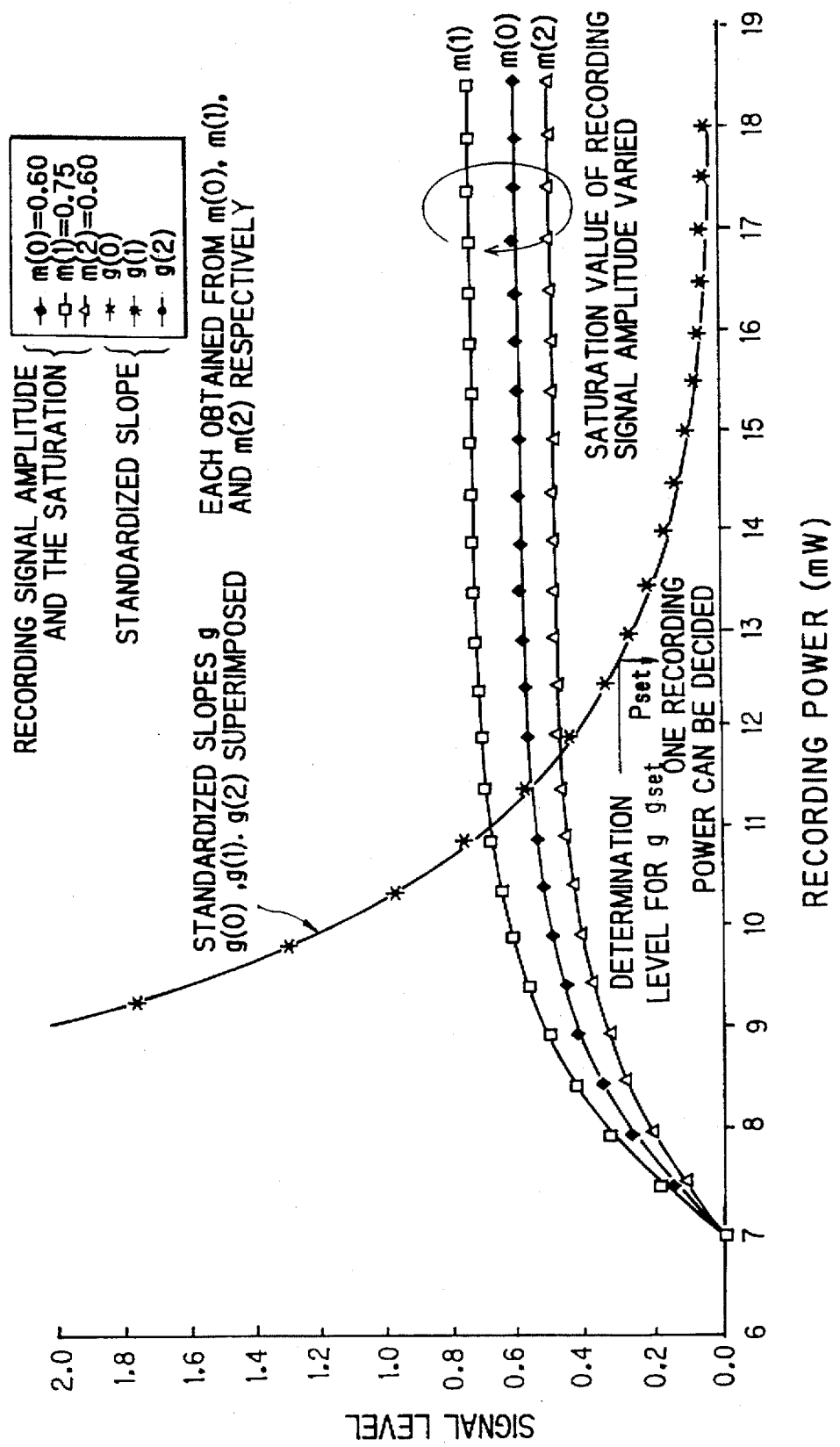
FIG. 12 is a view showing an example of effects in the embodiment of the present invention.

FIG. 12 shows an example of effects provided in the embodiment of the invention. Relations between amplitude m of pulse modulation for recording recorded and regenerated by 3 types of data recording/regenerating apparatus each different from that according to this embodiment and the recording power P are as shown in FIG. 12, and a saturation value of amplitude of pulse modulation for recording in each case is different: 0.60, 0.75, and 0.50 respectively, so that different curves m (0), m (1) and m (2) are provided, and in this case a uniform target optimal recording power can not be obtained even with reference to a certain pulse modulation for recording amplitude level, and nonuniformity is generated in response to the curves m (o), m (1) and m (2). Furthermore if P is larger than 12 mW (P>12 mW), the three curves m (0), m (1) and m (2) are almost parallel to each other, so that it is impossible even to set a common reference for pulse modulation for recording level.

As for the relation between a standardized gradation g and a recording power P in the embodiment of the invention, the curves (0), m(1), and m(2) obtained by computing through the expression for definition above are completely different from each other. For this reason, if a recording power giving, a prespecified level for determination for instance, $g_{set}=0.25$ using the curve for the standardized gradation g, even if data recording/regenerating apparatuses used are different, a unified recording power $P_{set}$ can be set without nonuniformity. In other words, in this embodiment, it is possible to accurately set an optimal recording power by recording data for testing in an optical data recording medium in which data can be recorded, and also it is possible to record data in an erasable optical data recording medium without giving damages to a recording film by irradiating an excessive recording power, and furthermore it is possible to make lagers the times of erasing and also to improve the reliability of recorded data. In addition, there occurs no nonuniformity such as different levels of pulse modulation for recording even if an identical recording power is used for various types of optical data recording/regenerating apparatuses, an optimal recording power can automatically be set without being affected by nonuniformity between various types of data recording/regenerating apparatus, and a low cost optical data recording/regenerating apparatus can be provided. This indicates excellent effects provided in the embodiment of the invention, and also indicates that the versatility and precision in recording power setting are very high.

As described above, in the embodiment of the invention, in the data recording/regenerating method in which, by irradiating an electro-magnetic wave to a data recording medium to generate a phase change in a recording layer, data is recorded in and regenerated from said data recording medium, and also in which rewriting of data is possible, data is recorded for testing in patterns each consisting of a not-recorded section and a recorded section changing a recording power P from time to time to said data recording medium, the data recorded for testing is regenerated and an amplitude m of pulse modulation for recording corresponding to a recording power P is monitored, a standardized gradation g (P) is obtained through the following expression:

$$g(P)=(\Delta m/m)/(\Delta P/P)$$

wherein $\Delta P$ is a minute change rate near P and $\Delta m$ is a minute change rate corresponding to $\Delta P$ near m; and an optimal recording power is decided and set by checking whether a recording power is excessive or short according to the standardized gradation g (P), so that, even for different types of data recording/regenerating apparatuses, it is possible to accurately a uniformed recording power without generating nonuniformity and also it is possible to increase the times when erasing is possible as well as to improve reliability of recorded data, and for this reason the versatility and precision in setting a recording power are very high.

Figure 13:
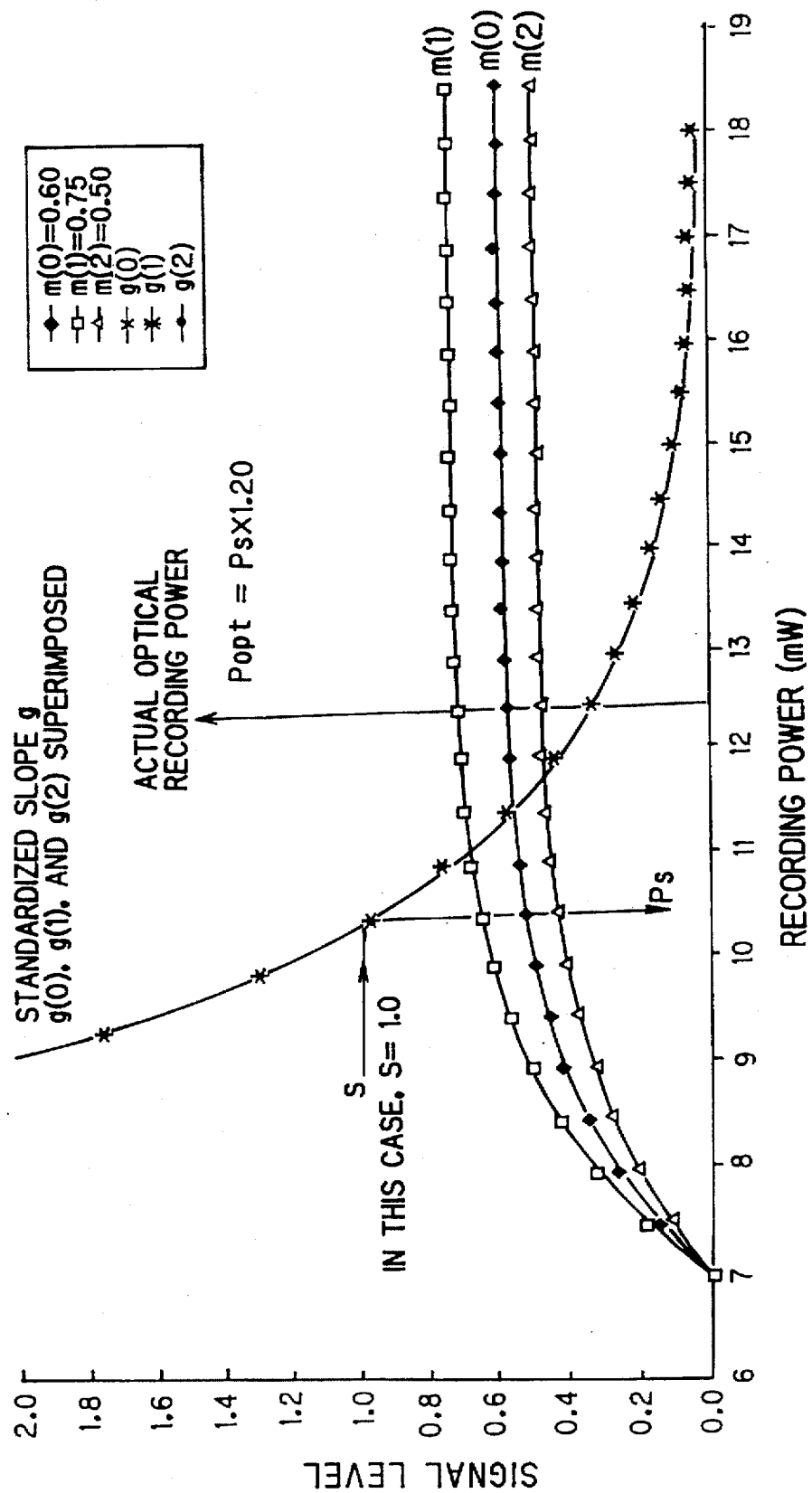
FIG. 13 is a view showing an example of effects in an embodiment of the present invention.

FIG. 13 shows an example of effects provided in the embodiment of the invention. In this embodiment, a relation between an amplitude m of pulse modulation for recording and a recording power P and a relation between a standardized gradation g and a recording power P are the same as those in the embodiment of the above invention. In the embodiment of the above invention, when setting an optimal recording power, in a range of P>13 mW where the amplitude m of a record signal is saturated to a recording power, a value of the standardized gradation g itself becomes smaller, and also a change rate to P becomes smaller, so that it is easily affected by external disturbance or noise and a precision in detection of P may become lower. In other words, it be better for improving a precision in detection of P to use a condition where a value of g is large and a change rate to P is also large (where a gradation is large).

FIG. 13 shows an example of effects provided in the embodiment of the present invention, and also this figure shows an effect provided by the method of detecting a recording power at which a value the standardized gradation g coincides with S as Ps in this embodiment. Ps is smaller than an actual optimal recording power $P_{opt}$, SO that $P_{opt}$ is set by multiplying this Ps by 1.20. The particular value of S may be selected from a range from 0.2 to 2.0 so that influence by noise will be negligible, and in this case it is possible to detect a recording power Ps corresponding to a set value S with high precision. Offset of a recording power Ps from the optimal recording power $P_{opt}$ can be checked by previously setting an appropriate value in a range from 1.0 to 1.7 times and by computing the optimal recording power $P_{opt}$ by multiplying Ps by this value. For this reason an optimal recording power can furthermore precisely be set.

As described above, in the data recording/regenerating method according to the embodiment of the invention in which, by irradiating an electro-magnetic wave to a data recording medium to generate a phase change in a recording layer, data is recorded in and regenerated from said data recording medium, and also in which rewriting of data is possible, data is recorded for testing in patterns each consisting of a not-recorded section and a recorded section changing a recording power P from time to time to said data recording medium, the data recorded for testing is regenerated and an amplitude m of pulse modulation for recording corresponding to a recording power P is monitored, a standardized gradation g (P) is obtained through the following expression:

$$g(P)=(\Delta m/m)/(\Delta P/P)$$

wherein $\Delta P$ is a minute change rate near P and $\Delta m$ is a minute change rate corresponding to $\Delta P$ near m; a particular value S selected from a range from 0.2 to 2.0 is set, a recording power Ps at which the standardized gradation g (P) coincides with the value of S is detected, and an optimal recording power is set by multiplying Ps by a value in a range from 1.0 to 1.7, so that it is possible to furthermore precisely set an optimal recording power and also to reduce a cost of a data recording/regenerating apparatus.

Also in the embodiment of the present invention, an x, y, z changing means for changing values of x, y and x according to a linear speed of a data recording medium are provided, so that an identical data according medium can be used in both the equal-speed mode in which the data recording medium is rotated at a rotational linear speed in a range from 1.2 to 1.4 m/s which is a reference speed for a compact disk and the double-speed mode in which the data recording medium is rotated at a rotational linear speed 2 times faster than the reference speed for a compact disk (in a range from 2.4 to 2.8 m/s). The x, y, z changing means sets values of x, y, z in the conditions of 0.5 T≦x≦2 T, 0.4≦y≦0.6, and 0.5 T≦z≦1 T respectively in the double speed mode, and in the conditions of 1 T≦x≦1.75 T, 0.4≦y ≦0.60, and 0.5 T≦z ≦1 T respectively in the equivalent speed mode.

The x, y, x changing means according to the present invention sets x, y, and z to optimal values respectively; namely x to 1 T, y to 0.5 T, and z to 0.5 T in the double-speed mode, and x to 1 T, y to 0.5 T, and z to 0.5 T respectively in the equivalent speed mode.

Herein the pulse section fp raises a temperature of a recording layer in a phase change type of data recording medium to the melting point for forming a header section of a record mark, the multi-path section mp raises a temperature of the recording layer to form an intermediate section of the record mark, and the pulse section op cools down the recording layer to form a rear edge section of the record mark, and also as, by changing a linear speed of the phase change type of data recording medium, a volume of electromagnetic wave irradiated onto the phase change type of data recording medium changes, and it is possible to raise a temperature of the recording layer to a level higher than the melting point, and also as the cooling speed after than changes, by changing values of x, y, z according to a rotational linear speed of the data recording medium, it is possible to record or rewrite high quality signals under stable conditions by adjusting values of x, y, and z even if a linear speed of a data recording medium changes, and the same data recording medium can be used in both the equivalent speed mode and in the double-speed mode.

Especially changing a value of x according to a linear speed of a data recording medium, it is possible to record and rewrite a header section of a record mark with high quality in the same data recording medium both in the equivalent speed mode and double-speed mode. Also by changing a value of z according to a linear speed of a data recording medium, it is possible to record and rewrite a rear edge section of a record mark under stable conditions in the same data recording medium both in the equivalent speed mode and double-speed mode. Furthermore by changing values of x, y, z according to a linear speed of a data recording medium, it is possible to record and rewrite a record mark as a whole with high quality and under stable conditions in the same data recording medium in both the equivalent speed mode and double-speed mode.

Figure 15:
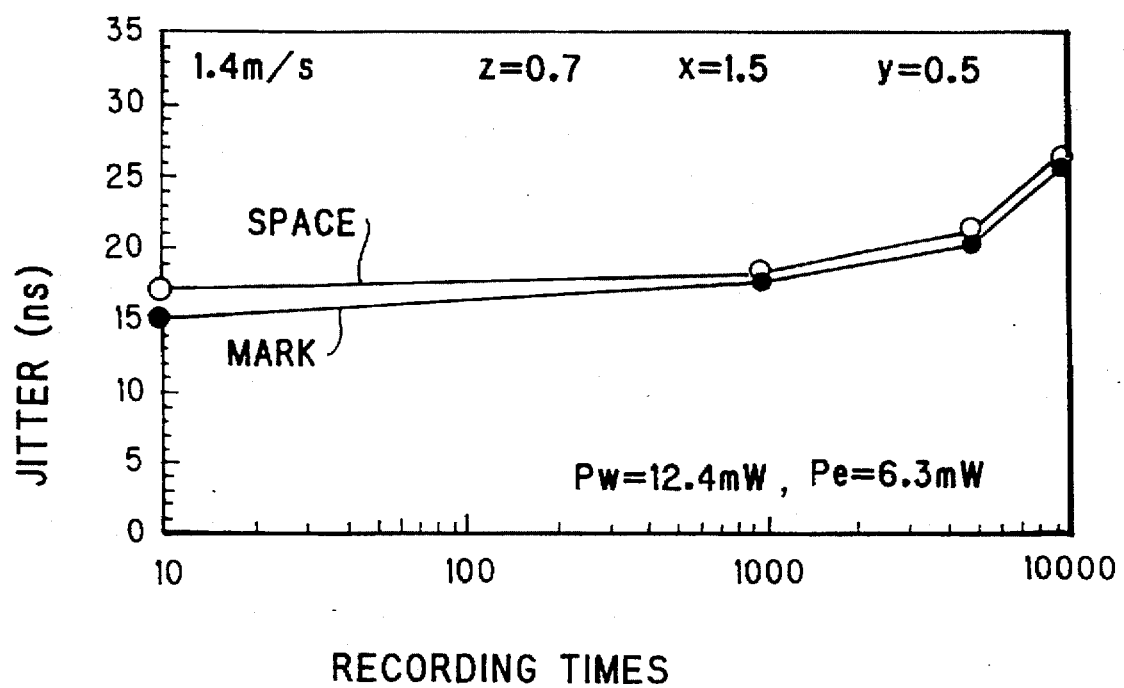
FIG. 15 is a characteristic view showing a result of determining recording times of marks and spaces as well as of the jitters at a speed as one time as that in the embodiments of the present invention.

FIG. 15 shows a result of measurement on a relation among a mark recorded in the equivalent speed mode, times of space recording, and jitter in the embodiment of the present invention. From this figure, it is understood that, in the embodiment of the invention, as times of mark and space recording in the equivalent speed mode increases, jitters increase, but that, by changing values of x, y, z according to a linear speed of the data recording medium as described above, it is possible to suppress jitters under a prespecified allowable level even if times of recording becomes larger to some extent.

As described above, in the embodiment of the present invention, in the data recording/regenerating method according to the present invention, as a value of x is set to a range of $1\ T \leq x \leq 1.75\ T$, and for this reason in the method of recording data in a phase change type of data recording medium according to the PWM recording system, it is possible to record and rewrite high quality signals under stable conditions, and also in a case where a data recording medium is moved at a reference linear speed, or in a case where a data recording medium is moved at a speed 2 times higher than the reference linear speed, it is possible to record and rewrite data with high quality in a header edge side of a recording section.

In the data recording/regenerating method according to the embodiment of the present invention, as a value of z is set in a range of $0.5\ T \leq z \leq 1\ T$, it is possible to record and rewrite high quality signals in a phase change type of data recording medium according to the PWM recording system, and both in a case where a data recording medium is moved at the reference linear speed and in a case where a data recording medium is moved at a speed 2 times faster than the reference linear speed, it is possible to record and rewrite data in a rear edge section of a recording section under stable conditions.

In the data recording/regenerating method according to the embodiment of the present invention, in a case where a data recording medium is moved at a reference linear speed for a compact disk, values of x, y, and z are set in the ranges of $1\ T \leq x \leq 1.75\ T$, $0.4 \leq y \leq 0.6$, and $0.5\ T \leq z \leq 1\ T$, respectively, so that it is possible to record and rewrite high quality signals in a phase change type of data recording medium according to the PWM recording system under stable conditions, and also both in a case where a data recording medium is moved at a reference linear speed for a compact disk and in a case where a data recording medium is moved at a speed 2 times faster than the reference linear speed, it is possible to record and rewrite data with high quality in the entire recording section under stable conditions.

As described above, in the data recording/regenerating method in which, by irradiating an electro-magnetic wave to a data recording medium to generate a phase change in a recording layer, data is recorded in and regenerated from the data recording medium, and also in which data is writable; in recording data in the data recording medium by modulating signals according to the PWM recording system, pulse modulation for recording when recording or rewriting a signal having a prespecified signal width after modulation is a continuous electro-magnetic wave at a first power level; a record signal pulse array when recording or rewriting a 1 signal having a prespecified signal width after modulation is an electromagnetic wave pulse array comprising a pulse section having a first time width and a second power level, a multi-pulse section in which low level pulses each at a third power level having a time width totally equal to a clock time and high level pulses each at a fourth power level alternately appear at a prespecified duty ratio prespecified times, and a pulse section having a second time width and a fifth power level, and the first time width, the duty ratio, and the second time width are respectively set according to a linear velocity, so that a signal of better quality can stably be recorded and rewritten in the method of recording data in the phase change type of data recording medium in the PWM recording system.

In the data recording/regenerating method in which, by irradiating an electro-magnetic wave to a data recording medium to generate a phase change in a recording layer, data is recorded in and regenerated from the data recording medium, and also in which data is writable; in recording data in the data recording medium by modulating signals according to the PWM recording system, pulse modulation for recording when recording or rewriting a 0 signal having a signal width of nT (T: Clock time) after modulation is a continuous electromagnetic wave at a power level e; a record signal pulse array when recording or rewriting 1 signal having a signal width of nT after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d; x, y, and z satisfy the relations of $0.5\ T \leq x \leq 2\ T$, $0.4 \leq y \leq 0.6$, and $0.5\ T \leq z \leq 1\ T$; n' is an integer equal to or smaller than n (n'≤n); and also the relation of (a and c)>e>(b and d) is satisfied, so that a signal of better quality can stably be recorded and rewritten in the method of recording data in the phase change type of data recording medium in the PWM recording system.

In the data recording/regenerating apparatus in which, by irradiating an electro-magnetic wave to a data recording medium to generate a phase change in a recording layer, data is recorded in and regenerated from the data recording medium, and also in which data is writable; the apparatus comprises a recording means for recording data in a data recording medium by modulating signals according to the PWM recording system, and a recording control means for controlling the recording means; and in the recording control means, pulse modulation for recording when recording or rewriting a 0 signal having a signal width of nT (T: Clock time) after modulation is a continuous electromagnetic wave at a power level e; a record signal pulse array when recording or rewriting 1 signal having a signal width of nT (T: Clock time) after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d; x, y, and z satisfy the relations of $0.5 T \leq x \leq 2 T$, $0.4 \leq y \leq 0.8$, and $0.5 T \leq z \leq 1 T$; n' is an integer equal to or smaller than n (n'$\leq$n); and also the relation of (a and c)>e>(b and d) is satisfied, so that a signal of better quality can stably be recorded and rewritten in the apparatus for recording data in the phase change type of data recording medium in the PWM recording system.

In the data recording/regenerating apparatus in which, by a irradiating an electro-magnetic wave to a data recording medium to generate a phase change in a recording layer, data is recorded in and regenerated from the data recording medium, and also in which data is writable; the apparatus has a recording means for recording data in the data recording medium by modulating signals according to the PWM recording system, and in the recording means, pulse modulation for recording when recording or rewriting a 0 signal having a signal width of nT (T: Clock time) after modulation is a continuous electromagnetic wave at a power level e; a record signal pulse array when recording or rewriting 1 signal having a signal width of nT (T: Clock time) after modulation is an electromagnetic wave pulse array comprising a pulse section fp having a time width x and a power level a, a multi-pulse section mp in which lower level pulses at a power level b having a time width of T in total and high power level pulses at a power level c alternately appear at a duty ratio of y (n–n') times in total, and a pulse section op having a time width z and a power level d; x, y, and z satisfy the relations of $0.5 T \leq x \leq 2 T$, $0.4 \leq y \leq 0.6$, and $0.5 T \leq z \leq 1 T$; n' is an integer equal to or smaller than n (n'$\leq$n); and also the relation of (a and c)>e>(b and d) is satisfied, so that a signal of better quality can stably be recorded and rewritten in the method of recording data in the phase change type of data recording medium in the PWM recording system.

In the data recording/regenerating method according to the present invention, a system of modulating a signal to be recorded is the EFM modulating system or an improved system thereof and n' is 2 (n'=2), so that it is possible to provide a recording method suited to a writable type of compact disk.

In the data recording/regenerating apparatus according to the present invention, the recording means modulates a signal to be recorded according to the EFM modulating system or the improved modulating system thereof and n' is 2 (n'=2), so that it is possible to provide a recording apparatus suited to a writable type of compact disk.

In the data recording/regenerating method according to the present invention, when regenerating data from a data recording medium, a signal detected by a detecting means from the data recording medium is subjected to DC coupling, m=(I1–I2)/I1×100 in which I1 indicates a high level in an output level of this DC coupling and I2 indicates a low level thereof is computed, and a and/or c is substantially decided according to this m, so that it is possible to obtain an optimal recording power in the method of recording data in the phase change type of data recording medium in the PWM recording system.

In the data recording/regenerating apparatus according to the present invention comprises a detecting means for detecting a signal from the data recording medium when regenerating data from the data recording medium, a DC coupling means for subjecting a signal detected by this detecting means to DC coupling; and a means for computing m=(I1–I2)/I1×100 from the high level I1 in an output level from this DC coupling means and the low level I2 thereof and deciding a and/or c according to the m, so that it is possible to obtain an optimal recording power in the apparatus for recording data in the phase change type of data recording medium in the PWM recording system.

In the data recording/regenerating method according to the present invention, a signal detected by the detecting means from the data recording medium when regenerating data from the data recording medium is subjected to AC coupling, $\beta$=(S1+S2)/(S1–S2)×100, in which S1 indicates a high level in an output level of this AC coupling and S2 indicates a low level thereof, is computed, and e and/or a, c are substantially decided according to this $\beta$, so that it is possible to obtain an optimal recording power in the method of recording data in the phase change type of data recording medium in the PWM recording system.

The data recording/regenerating apparatus according to the present invention comprises a detecting means for detecting a signal from the data recording medium when regenerating data from the data recording medium; an AC coupling means for subjecting a signal detected by this detecting means to AC coupling, and a means for computing $\beta$=(S1+S2)/(S1–S2)×100 from the high level S1 in an output level of this AC coupling and the low level S2 thereof and deciding e and/or a, c substantially according to this $\beta$, so that it is possible to obtain an optimal recording power in the apparatus for recording data in the phase change type of data recording medium in the PWM recording system.

In the data recording/regenerating method according to the present invention, an error is detected, and b and d are decided substantially according to the error, so that it is possible to provide a high-reliability signal recording method.

The data recording/regenerating apparatus according to the present invention comprises a means for detecting an error and deciding b and d substantially according to the error, so that it is possible to provide a high-reliability signal recording apparatus.

In the data recording/regenerating method according to the present invention, signals are recorded and/or rewritten by controlling a power level of an electromagnetic wave so that $\beta$ is not less than –2 and not more than 10, and for this reason it is possible to obtain a high-reliability and optimal suited recording power when signals are overwritten.

The data recording/regenerating apparatus according to the present invention comprises a means for having a signal recorded and/or rewritten by controlling a power level of an electromagnetic wave so that $\beta$ is not less than –2 and not more than 10, and for this reason it is possible to obtain a high-reliability and optimal recording power when signals are overwritten.

In the data recording/regenerating method according to the present invention, a signal is recorded and/or rewritten by controlling a power level of an electromagnetic wave so that e/a or e/c is not less than 0.3 and not more than 0.7, and for this reason it is possible to obtain an optimal recording power in the method of recording data in the phase change type data recording medium in the PWM recording system.

The data recording/regenerating apparatus according to the present invention comprises a means for having a signal recorded and/or rewritten by controlling a power level of an electromagnetic wave so that e/a or e/c is not less than 0.3 and not more than 0.7, and for this reason it is possible to obtain an optimal recording power in the apparatus for recording data in the phase change type data recording medium in the PWM recording system.

In the data recording/regenerating method according to the present invention; x, y, z and a power level of an electromagnetic wave for regenerating a signal are decided according to an amplitude of a reflected wave when regenerating data from the data recording medium, and for this reason it is possible to obtain an optimal record signal pulse wave form in the method of recording data in the phase change type data recording medium in the PWM recording system.

The data recording/regenerating apparatus according to the present invention comprises a means for deciding x, y, z and a power level of an electromagnetic wave for regenerating a signal according to an amplitude of a reflected wave when regenerating data from the data recording medium, and for this reason it is possible to obtain an optimal record signal pulse wave form in the apparatus of recording data in the phase change type data recording medium in the PWM recording system.

A data recording medium is the one used in the data recording/regenerating method according to the present invention, or in the data recording/regenerating apparatus according to the present invention, and the data recording medium comprises at least a substrate, a heat-resisting protection layer, and a recording layer, and for this reason it is possible to provide a data recording medium optimal for recording data in the phase change type of data recording medium in the PWM recording system.

The data recording medium according to the present invention comprises a reflecting/radiating layer, so that it is possible to provide a data recording medium optimal for recording data in the phase change type of data recording medium in the PWM recording system.

In the data recording medium according to the present invention, the heat-resisting protection layer is provided in both sides of the recording layer so that the former holds the latter from the two sides, and for this reason it is possible to provide a data recording medium optimal for recording data in the phase change type of data recording medium in the PWM recording system.

In the data recording medium according to the present invention, a film thickness of the heat-resisting protection layer provided between the substrate and the recording layer is in a range from 500 to 2500 angstroms, and for this reason it is possible to provide a data recording medium optimal for recording data in the phase change type of data recording medium in the PWM recording system.

In the data recording medium according to the present invention, in a case where the heat-resisting protection layer is provided on the recording layer, a film thickness of the heat-resisting protection layer is in a range from 100 to 1500 angstroms, and for this reason it is possible to provide a data recording medium optimal for recording data in the phase change type of data recording medium in the PWM recording system.

In the data recording medium according to the present invention, main constituent elements of the recording layer are Ag, In, Sb and Te, and for this reason it is possible to provide a data recording medium optimal for recording data in the phase change type of data recording medium in the PWM recording system.

In the data recording medium according to the present invention, a film thickness of the recording layer is in a range from 100 to 1000 angstroms, and for this reason it is possible to provide a data recording medium optimal for recording data in the phase change type of data recording medium in the PWM recording system.

In the data recording medium according to the present invention, the substrate is composed of glass, ceramics, or resin, and for this reason it is possible to provide a data recording medium optimal for recording data in the phase change type of data recording medium in the PWM recording system.

In the data recording medium according to the present invention, a material for the heat-resisting protection layer is a metallic oxide such as SiO, $SiO_2$, ZnO, $SnO_2$, $Al_2O_2$, $TiO_2$, $In_2O_2$, MgO, or $ZrO_2$; a nitride such as $Si_2N_4$, AlN, TiN, BN, or ZrN; a sulfide such as ZnS, $In_2S_3$, and $TaS_4$; a carbide such as SiC, Tac, $B_4C$, WC, TiC, or ZrC; a diamond carbon or a mixture thereof, and for this reason it is possible to provide a data recording medium optimal for recording data in the phase change type of data recording medium in the PWM recording system.

In the data recording medium according to the present invention, the reflecting/radiating layer is composed of a metallic material such as Al or Au, or an alloy thereof, and for this reason it is possible to provide a data recording medium optimal for recording data in the phase change type of data recording medium in the PWM recording system.

In the data recording medium according to the present invention, a film thickness of the reflecting/radiating layer is in a range from 300 to 2000 angstroms, and for this reason it is possible to provide a data recording medium optimal for recording data in the phase change type of data recording medium in the PWM recording system.

In the data recording/regenerating apparatus according to the present invention, the data recording medium is rotated at a rotational linear speed of not less than 1.2 m/s and not more than 5.6 m/s when data is recorded therein, and for this reason it is possible to obtain recording conditions suited for a writable type of compact disk.

A data recording medium is the one used in the data recording method according to the present invention or in the data recording/regenerating apparatus according to the present invention, and the data recording medium is rotated at a rotational linear speed of not less than 1.2 m/s and not more than 5.6 m/s, where data is recorded therein, and for this reason it is possible to obtain a data recording medium suited for a writable type of compact disk.

The data recording/regenerating apparatus according to the present invention comprises a means for temporally storing therein a portion of data to be recorded, and for this reason it is possible to improve versatility and compatibility of data recording medium used for a system in which the phase change type of data recording medium is used for a writable type of compact disk, and also to improve a reliability of the system. The data recording/regenerating apparatus according to the present invention comprises a means for increasing a rotational linear speed of the data recording medium, when data is recorded therein, to a level higher than a rotational linear speed of the data recording medium when data is regenerated therefrom, and for this reason it is possible to improve the versatility and compatibility of a system used for a writable type of compact disk.

In the data recording/regenerating method in which, by irradiating an electro-magnetic wave to a data recording medium to generate a phase change in a recording layer, data is recorded in and regenerated from the data recording medium, and also in which data is writable; data is recorded for testing in a pattern consisting of a not-recorded section and a recorded section by changing a recording power P to the data recording medium from time to time, an amplitude of the recorded signal corresponding to the recording power P is monitored by regenerating the data recorded for testing; a standardized gradation g (P) is calculated from the following expression:

$$g(P)=(\Delta m/m)/(\Delta P/P)$$

wherein $\Delta P$ indicates a minute change rate near P and $\Delta m$ indicates a minute change rate corresponding to $\Delta P$ near m; and an optimal recording power is decided and set by evaluating excess or shortage of a recording power according to the standardized gradation g (P), and for this reason it is possible to accurately set a single recording power without any dispersion thereof in any type even if data recording/regenerating apparatuses are different, and to increase of a number of erasable times for the apparatus as well as to improve reliability of the record, and high-versatility and setting precision of a recording power are excellent.

In the data recording/regenerating method in which, by irradiating an electro-magnetic wave to a data recording medium to generate a phase change in a recording layer, data is recorded in and regenerated from the data recording medium, and also in which data is writable; data is recorded for testing in a pattern consisting of a not-recorded section and a recorded section by changing a recording power P to the data recording medium from time to time, an amplitude of the recorded signal corresponding to the recording power P is monitored by regenerating the data recorded for testing; a standardized gradation g (P) is calculated from the following expression:

$$g(P)=(\Delta m/m)/(\Delta P/P)$$

wherein ΔP indicates a minute change rate near P and Δm indicates a minute change ate corresponding to ΔP near m; a particular value S selected in a range from 0.2 to 2.0 is set; a recording power Ps, for which the standardized gradation g (P) is identical to S, is detected; and an optimal recording power is set by multiplying Ps by a value in a range from 1.0 to 1.7, so that the optimal recording power can further be set to a higher precision one, and costs of a data recording/regenerating apparatus can be reduced.

In the data recording/regenerating method according to the present invention, x satisfies the relation of 1 T≦x≦1.75 T, so that a signal of a better quality can stably be recorded and rewritten in the phase change type of data recording medium in the PWM recording system, and also a top edge side of the recording section can finely and stably be recorded and rewritten when the data recording medium is moved at a standard linear speed and also when the data recording medium is moved at a speed twice as fast as the standard linear speed.

In the data recording/regenerating method according to the present invention, z satisfies the relation of 0.5 T≦z≦1 T, so that a signal of a better quality can stably be recorded and rewritten in the method of recording data in the phase change type of data recording medium in the PWM recording system, and also a rear edge side of the recording section can finely and stably be recorded and rewritten when the data recording medium is moved at a standard linear speed and also when the data recording medium is moved at a speed twice as fast as the standard linear speed.

In the data recording/regenerating method according to the present invention, x, y and z satisfy the relations of 1 T≦x≦1.75 T, 0.4≦y≦0.6, and 0.5 T ≦z≦1 T respectively when the data recording medium is moved at a standard linear speed for a compact disk, so that a signal of a better quality can stably be recorded and rewritten in the method of recording data in the phase change type of data recording medium in the PWM recording system, and also all the recording section can finely and stably be recorded and rewritten when the data recording medium is moved at a standard linear speed for a compact disk and also when the data recording medium is moved at a speed twice as fast as the standard linear speed for a compact disk.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data recording/regenerating method in which, by irradiating an electro-magnetic wave to a data recording medium to generate a phase change in a recording layer, data is one of recorded in, rewritten to and regenerated from said data recording medium, comprising the steps of:

recording data for testing in a pattern consisting of a not-recorded section and a recorded section by changing a recording power P to said data recording medium from time to time, an amplitude of the recorded signal corresponding to the recording power P being monitored by regenerating the data recorded for testing;

calculating a standardized gradation g (P) using the following expression:

$$g(P)=(\Delta m/m)/(\Delta P/P)$$

wherein m is amplitude of the pulse modification for recording, ΔP indicates a minute change rate near P and Δm indicates a minute change rate corresponding to ΔP near m; and an optimal recording power is decided and set by evaluating one of excess and shortage of a recording power according to said standardized gradation g (P).

2. A data recording/regenerating method in which, by irradiating an electro-magnetic wave to a data recording medium to generate a phase change in a recording layer, data is one of recorded in, rewritten to and generated from said data recording medium, comprising the steps of:

recording data for testing in a pattern consisting of a not-recorded section and a recorded section by changing a recording power P to said data recording medium from time to time, an amplitude of the recorded signal corresponding to the recording power P being monitored by regenerating the data recorded for testing;

calculating a standardized gradation g(P) using the following expression:

$$g(P)=(\Delta m/m)/(\Delta P/P)$$

wherein m is amplitude of the pulse modification for recording, ΔP indicates a minute change rate near P and Δm indicates a minute change rate corresponding to ΔP;

a particular value S selected in a range from 0.2 to 2.0 is set;

a recording power Ps for which said standardized gradation g(P) is identical to S, is detected; and an optimal recording power is set by multiplying Ps by a value in a range from 1.0 to 1.7.

* * * * *